(12) United States Patent
Schweinsberg et al.

(10) Patent No.: US 12,231,715 B2
(45) Date of Patent: Feb. 18, 2025

(54) VIDEO EDITING AND KEY-FRAMING ANIMATIONS USING ACCESSORY ON A TOUCH DEVICE

(71) Applicant: Apple Inc., Cupertino, CA (US)

(72) Inventors: David C Schweinsberg, Los Angeles, CA (US); Gregory E Niles, Culver City, CA (US); Shaun M Poole, Palo Alto, CA (US); Peter A Steinauer, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/314,101

(22) Filed: May 8, 2023

(65) Prior Publication Data

US 2024/0380945 A1    Nov. 14, 2024

Related U.S. Application Data

(60) Provisional application No. 63/500,897, filed on May 8, 2023.

(51) Int. Cl.
*H04N 21/472*    (2011.01)
*G06F 3/04847*   (2022.01)
(Continued)

(52) U.S. Cl.
CPC ..... *H04N 21/4312* (2013.01); *G06F 3/04847* (2013.01); *G06F 3/0488* (2013.01); *G06F 3/04883* (2013.01); *G06T 5/70* (2024.01); *G06T 5/73* (2024.01); *G06T 5/92* (2024.01); *G06T 11/001* (2013.01); *G06V 10/70* (2022.01); *G11B 27/031* (2013.01); *H04N 7/0122* (2013.01); *H04N 21/47217* (2013.01); *G06T 2200/24* (2013.01); *G06T 2207/10016* (2013.01)

(58) Field of Classification Search
CPC .......... H04N 21/47217; H04N 21/4312; G06F 3/04883
See application file for complete search history.

(56) References Cited

U.S. PATENT DOCUMENTS 5,521,841 A * 5/1996 Arman ................... H04N 5/147
                                                345/589
5,758,093 A * 5/1998 Boezeman .............. G06F 16/40
                                                715/202
(Continued)

*Primary Examiner* — Nicholas Augustine
(74) *Attorney, Agent, or Firm* — Invoke

(57) ABSTRACT

In one or more embodiments, a computing device is configured to present playback of a media composition on a touchscreen display. Concurrently with presenting the playback, the computing device receives, via the touchscreen display during a first time period, a touch input that includes a series of motions that start when a particular frame of the media composition is being presented. Responsive to receiving the touch input: the computing device adds a media clip to the media composition, with the media clip including a graphical representation of the touch input, having a duration corresponding to the first time period, and being stored in association with the particular frame. Subsequent to adding the media clip, the computing device presents a second playback of the media composition where playback of the media clip is initiated when playback of the particular frame is started during the second playback of the media composition.

20 Claims, 27 Drawing Sheets

(51) Int. Cl.
  *G06F 3/0488*    (2022.01)
  *G06F 3/04883*   (2022.01)
  *G06T 5/70*      (2024.01)
  *G06T 5/73*      (2024.01)
  *G06T 5/92*      (2024.01)
  *G06T 11/00*     (2006.01)
  *G06V 10/70*     (2022.01)
  *G11B 27/031*    (2006.01)
  *H04N 7/01*      (2006.01)
  *H04N 21/431*    (2011.01)
  *G06F 3/048*     (2013.01)

(56) References Cited

U.S. PATENT DOCUMENTS

| | | | | |
|---|---|---|---|---|
| 5,760,767 A * | 6/1998 | Shore | | G11B 27/034 |
| 5,852,435 A * | 12/1998 | Vigneaux | | G06F 16/40 |
| | | | | 345/428 |
| 6,332,147 B1 * | 12/2001 | Moran | | G06F 16/489 |
| | | | | 715/231 |
| 6,463,444 B1 * | 10/2002 | Jain | | G06F 16/78 |
| RE38,401 E * | 1/2004 | Goldberg | | G06F 16/54 |
| | | | | 715/802 |
| RE38,609 E * | 10/2004 | Chen | | G06F 3/0483 |
| | | | | 715/721 |
| 6,807,361 B1 * | 10/2004 | Girgensohn | | G11B 27/34 |
| | | | | 386/282 |
| 7,143,362 B2 * | 11/2006 | Dieberger | | G06F 16/338 |
| | | | | 715/764 |
| 7,149,974 B2 * | 12/2006 | Girgensohn | | G11B 27/34 |
| | | | | 715/788 |
| 7,660,464 B1 | 2/2010 | Peterson | | |
| 8,745,499 B2 | 6/2014 | Pendergast et al. | | |
| 9,600,164 B2 | 3/2017 | Matsuda et al. | | |
| 10,497,162 B2 | 12/2019 | Kunkel et al. | | |
| 10,937,200 B2 | 3/2021 | Kumar et al. | | |
| 11,425,283 B1 | 8/2022 | Thurston et al. | | |
| 11,550,452 B1 | 1/2023 | Fortunato | | |
| 11,669,567 B2 | 6/2023 | Klein et al. | | |
| 11,743,550 B2 | 8/2023 | Atkins et al. | | |
| 11,749,312 B2 | 9/2023 | Bache et al. | | |
| 11,887,630 B2 | 1/2024 | Wu et al. | | |
| 2003/0184598 A1 * | 10/2003 | Graham | | G11B 27/034 |
| | | | | 707/E17.058 |
| 2003/0189588 A1 * | 10/2003 | Girgensohn | | G06F 16/739 |
| 2005/0084232 A1 * | 4/2005 | Herberger | | G11B 27/34 |
| | | | | 386/282 |
| 2006/0093309 A1 * | 5/2006 | Herberger | | G11B 27/34 |
| | | | | 386/280 |
| 2014/0267094 A1 | 9/2014 | Hwang et al. | | |
| 2015/0077338 A1 | 3/2015 | Dai et al. | | |
| 2015/0234564 A1 * | 8/2015 | Snibbe | | G06T 11/60 |
| | | | | 715/716 |
| 2016/0006979 A1 | 1/2016 | Gilboa-Solomon et al. | | |
| 2016/0103830 A1 | 4/2016 | Cheong et al. | | |
| 2016/0358631 A1 * | 12/2016 | Lee | | G11B 27/105 |
| 2017/0352379 A1 * | 12/2017 | Oh | | G11B 27/11 |
| 2017/0364198 A1 | 12/2017 | Yoganandan et al. | | |
| 2019/0114485 A1 * | 4/2019 | Chan | | H04N 21/4662 |
| 2020/0296317 A1 * | 9/2020 | Post, Jr. | | H04N 7/0122 |
| 2021/0004131 A1 | 1/2021 | Varshney et al. | | |
| 2022/0028427 A1 | 1/2022 | Matsuda et al. | | |
| 2022/0327830 A1 * | 10/2022 | Chang | | H04N 5/268 |
| 2022/0335720 A1 * | 10/2022 | Chang | | A63F 13/60 |
| 2022/0353425 A1 | 11/2022 | Manzari et al. | | |
| 2023/0281904 A1 * | 9/2023 | Habib | | G06F 3/04847 |
| | | | | 345/473 |

\* cited by examiner

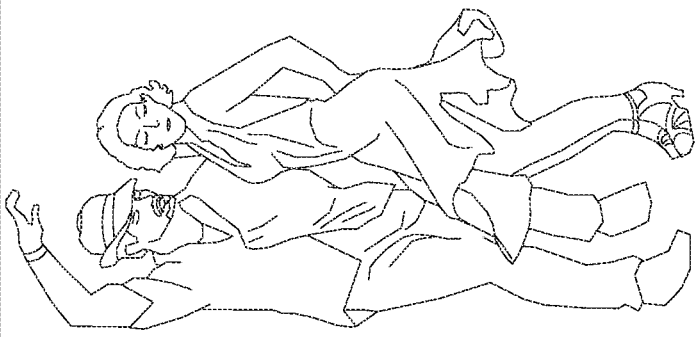

VIDEO EDITING AND KEY-FRAMING ANIMATIONS USING ACCESSORY ON A TOUCH DEVICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

INCORPORATION BY REFERENCE; DISCLAIMER

The following application is hereby incorporated by reference: application No. 63/500,897 filed on May 8, 2023. The Applicant hereby rescinds any disclaimer of claim scope in the parent application(s) or the prosecution history thereof and advises the USPTO that the claims in this application may be broader than any claim in the parent application(s).

TECHNICAL FIELD

The disclosure generally relates to generating telestrations and animations, and more specifically to receiving touch input during presentation of a media composition to capture telestrations and/or generate animations associated with a currently playing portion of the media composition.

BACKGROUND

Telestration and animation creation and modification on a tablet or slate computer, where user input is often received via a touchscreen display, can be a time consuming and error prone task, even for experienced video editors using expensive and design-built equipment. These issues are exacerbated when standard tablet computing equipment is used by novice and less-experienced users for telestration and animation creation and modification tasks.

An intuitive user interface design can enable more efficient and effective telestration and animation creation, particularly when the telestrations and animations are being created based on user inputs received via a touchscreen display.

OVERVIEW

In some implementations, a computing device is configured to present playback of a media composition on a touchscreen display of the computing device. Concurrently with presenting the first playback of the media composition: receiving, via the touchscreen display of the computing device during a first time period, a touch input that includes a series of motions that start when a particular frame associated with the media composition is being presented. Responsive to receiving the touch input: the computing device adds a media clip to the media composition, with the media clip including a graphical representation of the touch input, having a duration corresponding to the first time period, and being stored in association with the particular frame of the media composition. Subsequent to adding the media clip to the media composition, the computing device presents a second playback of the media composition where playback of the media clip is initiated when playback of the particular frame is started during the second playback of the media composition.

In some implementations, a computing device can play the media clip during playback of the media composition for the duration corresponding to the first time period.

According to some implementations, the media clip may be overlaid on at least one video clip of the media composition, thereby providing a graphical overall for the underlying video clip.

In one or more implementations, the computing device may receive user input modifying the media clip in a manner which adjusts the duration of the media clip, and in any playback of the media clip subsequent to adjusting the media clip, the computing device may playback the media composition such that the media clip is played with the modified duration.

In some implementations, the computing device may receive user input modifying the media clip in a manner which adjusts an appearance of the media clip during playback, and in any playback of the media clip subsequent to adjusting the media clip, the computing device may playback the media composition such that the media clip is played with the modified appearance.

In one or more embodiments, the computing device may generate an animation for an image object based on user input. The computing device is configured to receive a set of user inputs selecting a first position for the image object to generate a first frame of the animation and a second position for the image object to generate a second frame of the animation. The computing device generated the animation at least by: (a) generating the first frame of the animation displaying the image object at the first position, (b) generating the second frame of the animation displaying the image object at the second position, (c) creating a set of frames that visualize a transition of the image object from the first position to the second position, and (d) assembling, in the following order, the first frame, the set of frames, and the second frame to form the animation.

Particular implementations provide at least the following advantages. A user is able to generate animations that are captured and integrated with an associated portion of the media composition without relying on cumbersome or error-prone manual manipulation of individual frames.

Details of one or more implementations are set forth in the accompanying drawings and the description below. Other features, aspects, and potential advantages will be apparent from the description and drawings, and from the claims.

DESCRIPTION OF DRAWINGS

FIGS. 7A-7G show example user interfaces for generating a telestration, in one or more embodiments.

Like reference symbols in the various drawings indicate like elements.

DETAILED DESCRIPTION

Telestration Based on Touch Input

Figure 1:
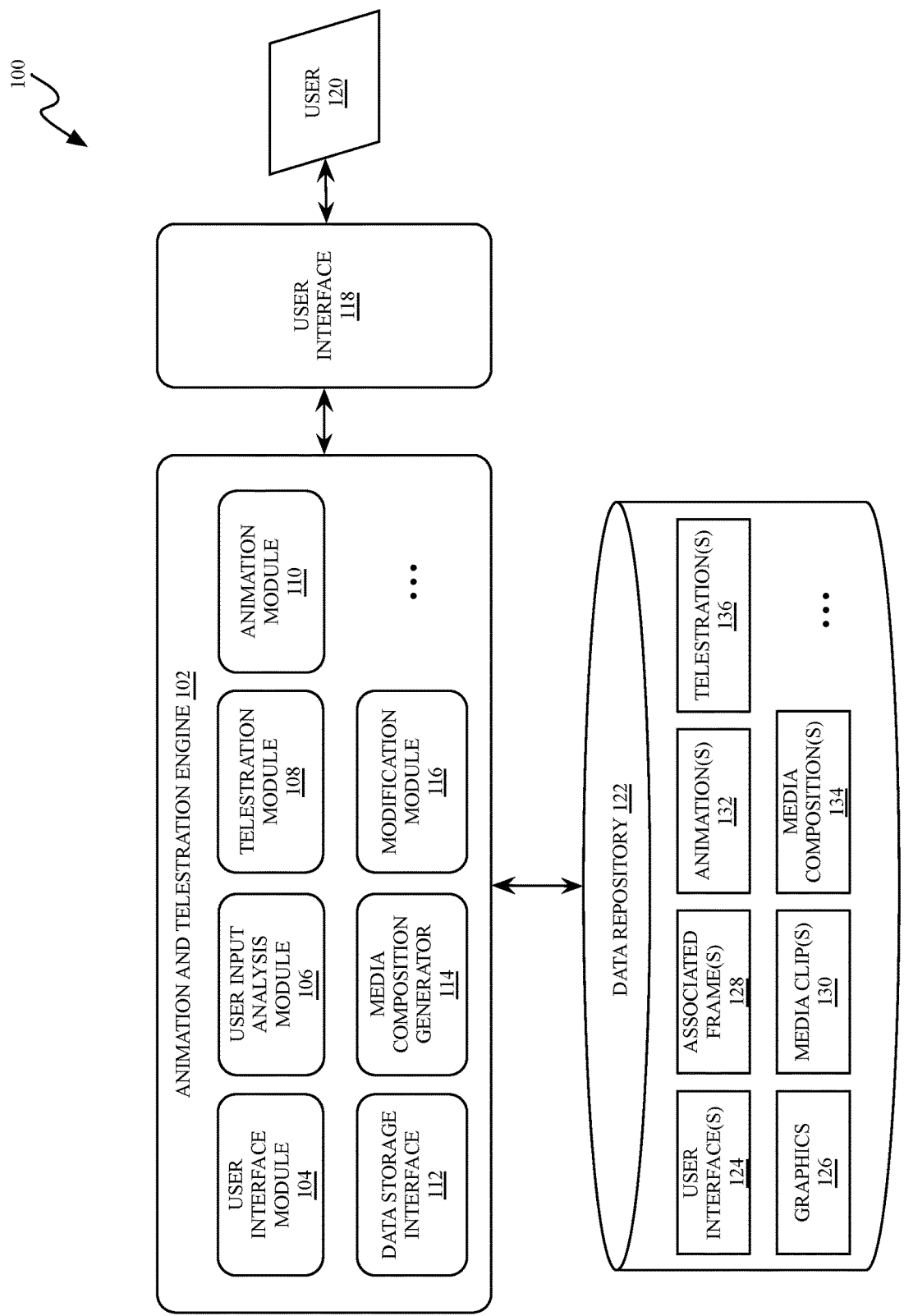
FIG. 1 is a block diagram of an example system for generating a media clip based on touch input.

FIG. 1 is a block diagram of an example system 100 for animation and telestration based on touch input. System 100 includes an animation and telestration engine 102 that is electronically coupled to at least one data repository 122. Animation and telestration engine 102 includes a set of modules and/or processes configured for performing one or more function for capturing user input and generating animations and/or media clips showing telestrations based on the user input, which are described below.

In one or more approaches, user interface module 104 of the animation and telestration engine 102 is configured to create and/or build one or more user interfaces 118 for providing information to a user 120 and receiving user inputs. A user interface 118 may be dynamically updated based on user input received through the user interface 118 in various embodiments. Moreover, the user interface 118 may be configured to be used on a touchscreen display.

One or more user interfaces 124 that have been generated by user interface module 104 may be stored to the data repository 122, in various approaches. The user interfaces 124 may be generated based on user interface templates, and the generated user interfaces 124 may be stored to data repository 122 with some associated identifier for quicker searching and retrieval when a specific type of user interface is requested for presentation to the user 120.

The user input analysis module 106 of the animation and telestration engine 102 is configured to analyze user input provided by the user 120 that is received via the active user interface 118. In a further embodiment, user input analysis module 106 may be configured to analyze touch inputs received via a touchscreen display. These touch inputs may include finger touch inputs, stylus touch inputs, and/or hover inputs where a user hovers close to the touchscreen display but does not actually contact the touchscreen display. A hover input may cause a different action to be taken versus a touch contact. Moreover, swipe inputs and multiple tap inputs may also be received via the touchscreen display and may result in different actions to be taken versus a single touch contact.

Telestration module 108 may be provided with information about received user input and generate one or more telestrations 136 based on the received user input. Telestration module 108 may generate a telestration 136 to have a form and shape based on the received user input. Moreover, the form or shape may be generated based on options and/or settings selected by a user 120 prior to, during, and/or subsequent to providing the user input. In one embodiment, the user input comprises touch input received via a touchscreen display.

According to one or more approaches, user input may be received while presenting a first playback of a media composition 134 on a touchscreen display of a computing device. A media composition may include video, audio, images, moving images, animations, etc., or any combination thereof. In an embodiment, media composition generator 114 may generate a media composition 134, based on available media content and/or user input.

The user interface module 104 may, concurrently with presenting playback of the media composition 134 and via the touchscreen display over the course of a first time period, receive a touch input via the user interface 118. The touch input includes, at least, a series of motions that start when a particular frame associated with the media composition 134 is being presented on the touchscreen display. In other words, the user 120 may draw, with a finger, stylus, or some other touch-capable implement, about the touchscreen display while the media composition 134 is being played back. The drawing may be positioned over certain elements of the media composition being played back, such as circling a feature, crossing out an unwanted image, writing notes about what is being shown, etc. The user interface module 104 and/or user input analysis module 106 captures this touch input, the user input analysis module 106 analyzes the captured touch input, and the telestration module 108 generates a corresponding telestration 136 to be added in a media clip 130 to the media composition 134 being played back.

In one embodiment, responsive to receiving the touch input, the media composition generator 114 may generate and add a media clip 130 to the media composition 134 for subsequent playback. The media clip 130 includes the generated telestration 136 that is based on the series of motions included in the touch input. Accordingly, the media clip 130 includes a graphical representation (e.g., telestration 136) of the touch input and has a duration corresponding to the first time period during which the touch input was received while the media composition 134 was being played back. The animation and telestration engine 102 may store the media clip 130 having the telestration 136 in association with the particular frame of the media composition 134 to data repository 122, in an approach.

In an approach, the associated frame(s) 128 may be stored to data repository 122, such that the media clip 130 may be added to the media composition 134 at the appropriate point during playback.

In one embodiment, the media clip 130 may consist of a single video track that includes the graphical representation of the touch input (e.g., the telestration 136).

In some embodiments, subsequent to adding the media clip 130 to the media composition 134, the animation and telestration engine 102 may present another playback of the media composition 134. During the subsequent playback of the media composition 134, via the user interface 118, the media clip 130 will be played back when playback of the particular frame is initiated during the subsequent playback of the media composition 134.

In one approach, the media clip 130 may be played, during playback of the media composition 134, for the duration that corresponds to the first time period. In a further approach, the duration equals the first time period. In other approaches, the duration may be proportional to the first time period, e.g., 50% of the time period, 75% of the time period, 125% of the time period, etc.

During playback of the media composition 134, the media clip 130 having the generated telestration 136 is overlaid on at least one video clip of the media composition 134. In one embodiment, the video clip that was being played back when the touch input was received is the same video clip that the media clip 130 is overlaid above.

The modification module 116 is configured to allow the user 120 to provide one or more modifications to the media clip 130 and/or telestration 136 therein. The modification module 116 receives user input modifying the media clip 130 and/or telestration 136 thereof. The user input modifying the media clip 130 and/or telestration 136 thereof may be provided to the modification module 116 by the user interface module 104 in an approach. In response to the user input modifying the media clip 130 and/or telestration 136 thereof, modification module 116 may adjust and/or modify the media clip 130 and/or telestration 136 thereof in accordance with the user input.

In one embodiment, the modification user input may indicate a new duration for the media clip 130. In response to the indicated new duration, modification module 116 will adjust the media clip 130 to have the new duration. After this modification, during each subsequent playback of the media composition 134, the media clip 130 is played for the new duration instead of the original duration associated with the first time period.

In an embodiment, the modification user input may modify one or more frames of the media clip 130. For example, modifications may include, but are not limited to, clipping the media clip 130 to remove at least one portion of the media clip 130 (e.g., making the media clip 130 shorter in duration and removing content from an end), shrinking the media clip 130 to condense content of the media clip during playback of the modified media clip (e.g., shrinking the duration of playback but not removing any content), expanding the media clip 130 to stretch the content of the media clip during playback of the modified media clip (e.g., expanding the duration of playback without adding any content to the media clip), changing a color of the graphical representation of the touch input (e.g., changing a color for the telestration 136), changing a thickness of the graphical representation of the touch input (e.g., changing a thickness of lines for the telestration 136), changing a style of the graphical representation of the touch input (e.g., changing the form, look, appearance, and/or size of the telestration 136), etc.

In response to the modifications to the frames of the media clip 130, modification module 116 will adjust the media clip 130 to generate a modified version of the media clip 130 that shows the modified frames that are based on the modification user input.

In one or more approaches, additional touch inputs may be received by the animation and telestration engine 102 during playback of the media composition 134. Each of these additional touch inputs may be processed and analyzed, as described above to form additional telestrations 136, that may be added to the media composition 134 within media clips 130 associated with particular frames of the media composition that were playing back when the touch input was received.

The options may describe the shape, look, color, style, size, size of tip, and/or duration of the resulting telestration 136. In one or more embodiments, telestration module 108 may store a generated telestration 136 in the data repository 122. Some example telestrations 136 include, but are not limited to, a straight line, a freehand line, a line fitted to a curve, display of a shape that is selected by the user 120 (e.g., a box, a rectangle, a triangle, a circle, an oval, etc.), an image object, a graphical representation of the user input (e.g., graphics 126), an emoji, text, etc. Each of these various types of telestrations may have different appearances based on how the user 120 entered the user input via the user interface 118.

For example, user 120 may select a line tool and the color red, and then draw a straight line connecting two shapes being shown during playback of a media composition over a time period of five seconds. In this example, the user input analysis module 106 would determine that the user input described a straight red line that is created over a time period of five seconds that starts at a first position and ends at a second position. The telestration module 108 would then generate a telestration of a straight red line that is drawn from a first position to a second position over a five second time period, and store the telestration as a media clip that may be overlaid on video clips of the media composition and/or added to the media composition.

Animation and telestration engine 102 includes a data storage interface 112 for storing data to data repository 122 and for retrieving data from data repository 122. Data repository 122 may be used to store information and/or data for animation and telestration engine 102 and may be any type of storage unit and/or device (e.g., a file system, database, collection of tables, or any other storage mechanism) for storing data. Further, data repository 122 may include multiple different storage units and/or devices. The multiple different storage units and/or devices may or may not be of the same type or located at the same physical site. Data repository 122 may be implemented or may execute on the same computing system as animation and telestration engine 102. Alternatively or additionally, data repository 122 may be implemented or executed on a computing system separate from animation and telestration engine 102. Data repository 122 may be communicatively coupled to any device for transmission and receipt of data via a direct connection or via a network.

Animation Based on Touch Input

Animation and telestration engine 102 may include an animation module 110, alone or in conjunction with telestration module 108, in various approaches. Animation module 110 is configured to receive touch input, via user interface 118 that is displayed to a touchscreen display, and generate one or more animations 132 based on the touch input.

The animation module 110 receives a first user input selecting a first position for an image object to be placed (within a media composition 134, media clip 130, or a blank template). This first position is used by the animation module 110 to generate a first frame of an animation 132. The animation module 110 also receives a second user input selecting a second position for the image object, and uses this second position to generate a second frame of the animation 132. In other words, the user 120 indicates a starting position and an ending position for an image object to traverse over a certain period of time.

In an embodiment, user input is received via the touchscreen display by the user 120 tapping, touching, or using a stylus or other touch-capable implement to indicate a position on the touchscreen display where the image object is to be located at one or more points in time associated with particular frames of an underlying media composition 134 or media clip 130.

The image object may be selected, by the user 120 via the user interface 118, from a set of predefined graphics 126. The graphics 126 may be stored to data repository 122 or available to the animation and telestration engine 102 for use in animation creation. Example graphics include, but are not limited to, letters, numbers, emojis, stock images, common shapes, images retrieved via a search, etc.

Based on these starting and ending positions, the animation module 110 generates the animation 132. The animation module 110 may perform the following operations in generating the animation 132: generate the first frame of the animation 132 which displays the image object at the first position, generate the second frame of the animation which displays the image object at the second position, create a set of multiple frames that, when viewed in series, visualize a transition of the image object from the first position to the second position, and assemble, in order, the first frame, the set of frames, and the second frame to form the animation 132.

In one embodiment, prior to or concurrent with receiving the user input specifying the first position, the animation module 110 may receive user input specifying one or more aspects of the animation 132. Some example aspects include, but are not limited to, which graphic(s) to include, letters, numbers, a color, a style, a size, a duration, audio to include with the animation 132, etc. Based on these specified aspects, during playback of the animation 132, the image object is displayed in accordance with the specified aspects, for at least a portion of the animation 132 (or throughout a duration of the animation 132 in a further approach). Different aspects may be selected for the animation that will occur during different portions of the animation 132, which may also be specified by the user 120 (e.g., changing color(s), increasing in size, decreasing in size, flashing, vibration, glowing, changing from one image object to another, etc.).

Animation module 110 may generate multiple different animations 132, each of which may be stored to data repository 122 for inclusion in one or more media compositions 134 and/or media clips 130, in various approaches.

The user 120 may select which type of transition to show the image object move from the first opposition to the second position. For example, the user 120 may provide user input selecting, for the transition, interpolated movement along one or more curves on a path from the first position to the second position. In response to this selection, animation module 110 will generate the set of frames to visualize the interpolated movement along the one or more curves on the path from the first position to the second position.

In another example, the user 120 may provide user input selecting, for the transition, linear movement along one or more straight lines on a path from the first position to the second position. In response to this selection, animation module 110 will generate the set of frames to visualize the linear movement along the one or more straight lines on the path from the first position to the second position.

If a single straight line is indicated, the movement will be along a straight line from the first position to the second position. If additional positions are input by the user 120, then multiple straight and/or curved lines may be used to display the transition of the image object along paths between the various positions.

In an embodiment, the animation module 110 may receive user input from the user 120 selecting a third position for the image object. Responsive to this user input, the animation module 110 generates a third frame of the animation 132 which is positioned between the first frame and the second frame. Based on this third position being selected, the animation module 110 generates the set of frames that visualize the transition of the image object from the first position to the second position by creating a first subset of frames that visualize a first portion of the transition of the image object showing the image object transitioning from the first position to the third position and creating a second subset of frames that visualize a second portion of the transition of the image object showing the image object transitioning from the third position to the second position. Based on this set of frames, the animation module 110 assembles, in order, the first frame, the first subset of frames, the third frame, the second subset of frames, and the second frame to form the animation 132.

The animation module 110 may determine a duration for the animation 132 based on user input specifying the duration, in an approach. Based on this duration, the animation module 110 will generate a number of frames for the transition that corresponds to the specified duration for the animation. For example, if the duration is 1 second, and the animation module creates one frame per hundredth second, then the transition will be generated to include 98 frames of movement, with the first frame and second frame making up the 100 frames needed to last one second in playback time.

In an approach, a media composition 134 and/or media clip 130 may be playing back while the user input is received to form the animation 132. In this case, the animation module 110 receives the first user input in association with a first frame of the media composition 134 and/or media clip 130, receives the second user input in association with a second frame of the media composition 134 and/or media clip 130. Based on these associated frames 128, which may be stored to data repository 122, the animation module 110 may determine that the duration corresponds to a period of time between playback of the first frame and the second frame during a playback of the media composition 134 and/or media clip 130.

In one or more embodiments, the animation module 110, media composition generator 114, and/or modification module 116 may add the animation to the media composition 134 and/or media clip 130. Thereafter, when the animation and telestration engine 102 presents a playback of the media composition 134 and/or media clip 130 to which the animation 132 was added, the animation 132 is initiated when playback of the first frame is initiated during playback of the media composition 134 and/or media clip 130 and the animation 132 ceases subsequent to playback of the second frame during playback of the media composition 134 and/or media clip 130.

In an embodiment, the animation 132 may be overlaid on at least one video clip of the media composition 134 and/or media clip 130.

Modification module 116 may receive user input modifying the duration of the animation 132. In this embodiment, modification module 116 will adjust the animation 132 to have a second duration based on the received user input, and any subsequent use of the animation 132 during playback the media composition 134 and/or media clip 130 will display the animation with the modified duration.

Similarly, if a user 120 changes the animation 132 in any way via the user interface 118, those changes will be reflected in playback of the animation 132. However, different versions of the animation 132 may be stored to data repository 122, in some approaches, allowing for the different version to be used in the different media clips 130 and/or media compositions 134 as indicated by the user 120.

Some example modifications include, but are not limited to, clipping the animation 132 to remove at least one portion of the animation, shrinking the animation 132 to condense content of the animation during playback of the modified version of the animation, expanding the animation 132 to stretch the content of the animation during playback of the modified version of the animation, changing a color of the image object, changing a size of the image object, changing a style of the transition of the image object from the first position to the second position, etc.

Example User Interfaces

Figure 2:
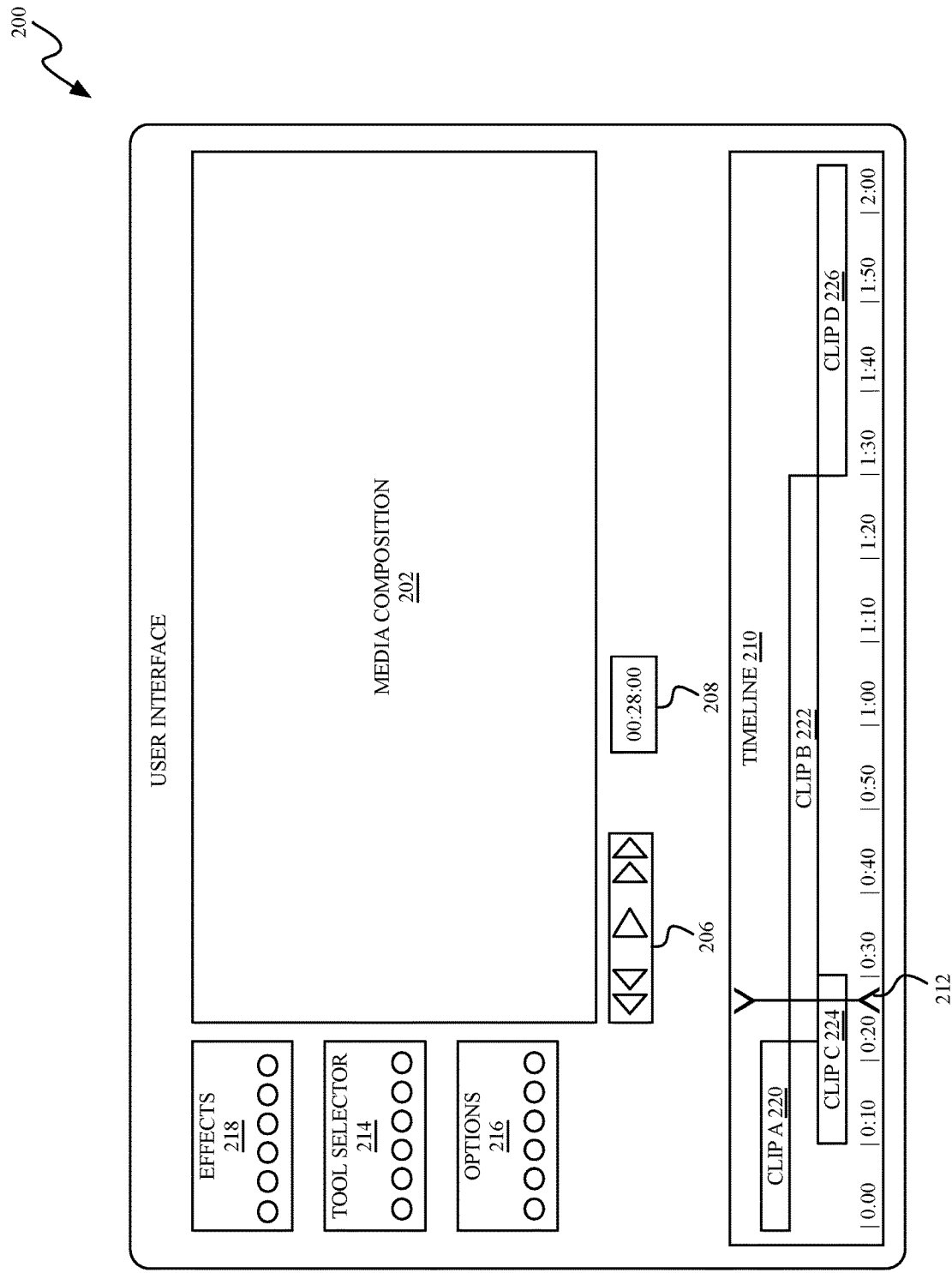
FIG. 2 shows an example user interface for generating animation(s) and/or telestration(s) based on touch input.

FIG. 2 shows an example user interface 200 for generating telestration(s) and/or animation(s) for inclusion in a media composition 202 and/or a media clip. As shown in this embodiment, user interface 200 concurrently displays a first display area showing the media composition 202 and a timeline 210 indicating, temporally, the currently displayed portion of the media composition 202.

In one embodiment, the timeline 210 allows easy manipulation of the current playback time by adjusting a position of the playback head indicator 212 along a timescale. The timeline 210 further displays how the media composition 202 has been assembled by showing each media clip within the media composition 202 positioned along the timeline 210 from a starting time to an ending time for the respective media clip. Moreover, each of these clips may be movable along the timeline 210, such as by a drag-and-drop touch input via a touchscreen display, to reposition the clips within the media composition 202.

For example, clip A 220 starts at time 0:00 and ends at time 0:21 (a span of 21 seconds), clip B 222 starts at time 0:21 and ends at time 1:30 (a span of 69 seconds), clip C 224 starts at time 0:10 and ends at time 0:30 (a span of 20 seconds), and clip D 226 starts at time 1:30 and may extend beyond the current timescale shown on the timeline 210.

The actual media content of clip A 220, clip B 222, clip C 224, and clip D 226 may have originated from any source available in user interface 200, in one or more embodiments. Moreover, any of the clips may represent audio-only, video-only, or audio-video portions from a source media clip.

In one embodiment, display of the media composition 202 is time-synchronized to a time associated with the playhead indicator 212 movable along the timeline 210.

User interface 200, in some approaches, may include playback controls 206, which may include selectable graphical elements for controlling playback of the media composition 202 after creation of a portion thereof, such as play, pause, stop, skip ahead, skip back, etc. In one approach, user interface 200 may be implemented on a touchscreen display, and user input to the playback controls 206 may be received via finger touch input, stylus touch input, and/or hover input.

A hover input occurs when a user hovers close to the touchscreen display but does not actually contact the touchscreen display, which may cause a different action to be taken versus a touch contact. Moreover, swipe inputs and multiple tap inputs may also be received via the touchscreen display and may result in different actions to be taken versus a single touch contact.

User interface 200, in some approaches, may include a time indicator 208 that shows the current time of playback for the media composition 202. This time indicator 208 may be synchronized with the playback head indicator 212 shown in the timeline 210. In some embodiments, the time indicator 208 may be selectable to change the time that is displayed by the time indictor 208 between an elapsed time, a remaining time, a total time, a time associated with a certain media clip, etc.

In an embodiment, user interface 200 may include one or more interface elements 214, 216, 218 for selection of various tools, options, and effects. As shown, user interface 200 includes a tool selector interface element 214 that allows for user selection of which tool to use in adding telestration to the media composition 202. Some examples tools include, but are not limited to, a pencil tool, a marker tool, a highlighter tool, a paintbrush tool, a spray can tool, a shape tool, a graphics selection tool, a graphics search tool, etc.

In one embodiment, selection of one of these tools from tool selector interface element 214 allows a user to draw or telestrate upon the visual representation of the media composition 202 using the selected tool, with results of the telestration being shown in the first display area after creation during a corresponding time frame for displaying the telestration.

In another embodiment, selection of one of these tools from tool selector interface element 214 allows a user to create an animation upon the visual representation of the media composition 202 using the selected tool, with the generated animation being shown in the first display area after creation when playing back the media composition 202 during a corresponding time frame of generation of the animation.

In one approach, user interface 200 may include an options interface element 216, which allows a user to select from one or more options for the telestration and/or animation added to the media composition 202. Example options include, but are not limited to, audio-only input, video-only input, color, size, duration, letters, numbers, style, audio to include with the animation/telestration, etc.

According to an embodiment, user interface 200 may include an effects selector 218 which allows for application of one or more effects to the media composition 202, animation, and/or telestration. Some example effects that can be applied include, but are not limited to, altering the speed (e.g., slow-motion or fast-motion), filter application (e.g., blur, black-and-white, drawing effect, color enhancing, color altering or reversal, sharpening, softening, etc.), sound manipulation (e.g., enhancing the sound, amplifying sounds within a selected range, deadening sounds within a selected range, loudness alteration, etc.), jitter reduction, motion smoothing, unwanted object removal etc.

A user may manipulate playhead indicator 212 to revisit portions of the media composition 202 that have already been played to add and/or replace telestrations and/or animations. This may be performed by selecting an appropriate tool from the tool selector interface element 214, and touching the media composition 202 in the first display area to indicate new telestration and/or animation.

Figure 3A:
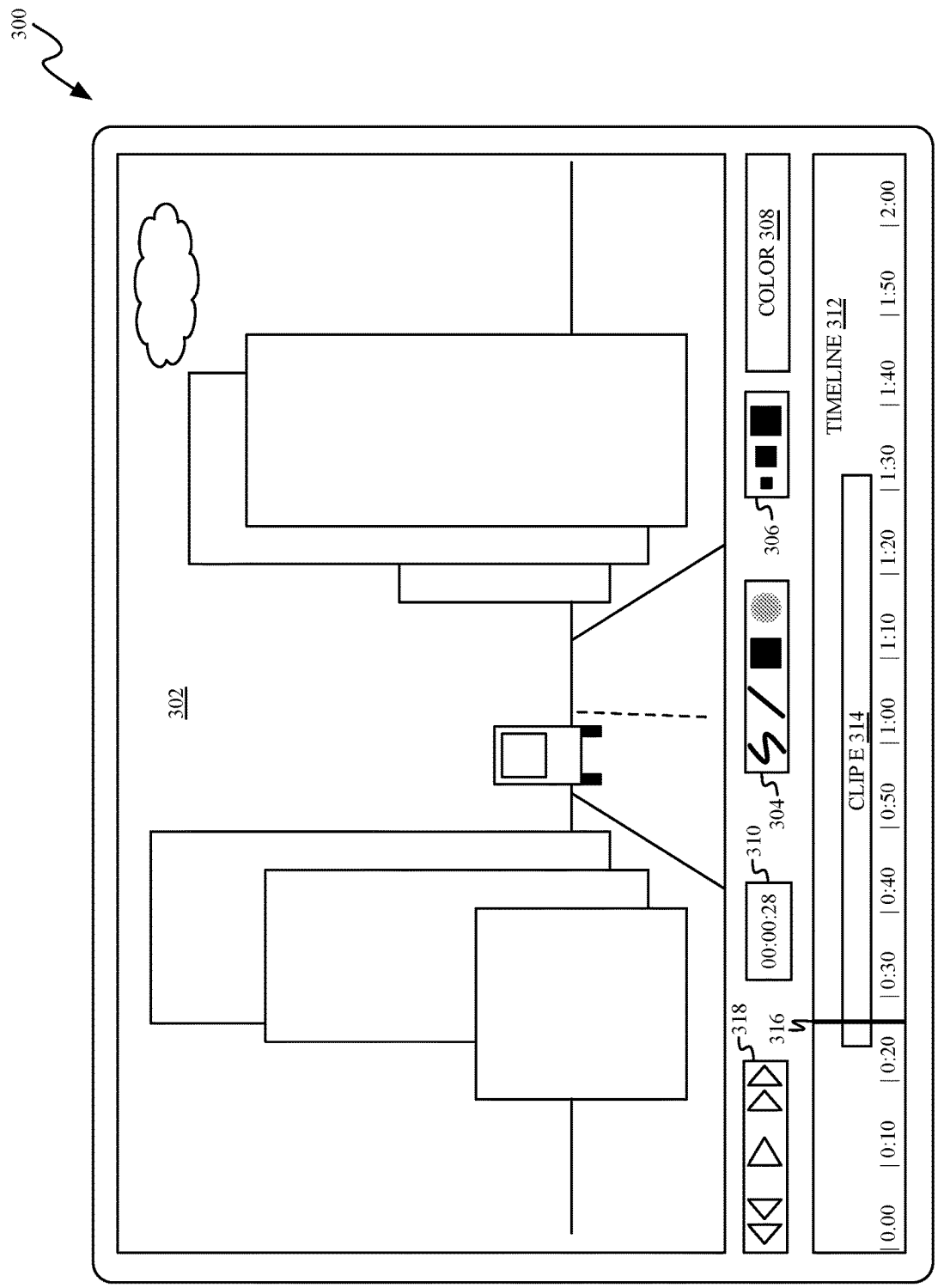
FIGS. 3A-3E show an example set of user interfaces for generating a telestration.

FIGS. 3A-3E show an example set of user interfaces for generating a telestration, in one or more embodiments. In FIG. 3A, user interface 300 shows a particular frame of a media composition 302 that is being played back. This particular frame is from clip E 314 and occurs at the 00:00:28 mark of the media composition 302, as indicated on the timeline 312. The frame shows a vehicle travelling along a street between buildings.

User interface 300 includes playback controls 318, which may include selectable graphical elements for controlling playback of the media composition 302, such as play, pause, stop, skip ahead, skip back, etc.

User interface 300 also includes a time indicator 310 that shows the current time of playback for the media composition 302. This time indicator 310 may be synchronized with the playback head indicator 316 shown in the timeline 312. In some embodiments, the time indicator 310 may be selectable to change the time that is displayed by the time indictor 310 between an elapsed time, a remaining time, a total time, a time associated with a certain media clip, etc.

User interface 300 also includes one or more interface elements 304, 306, 308 for selection of various tools, options, and effects. As shown, user interface 300 includes a tool selector interface element 304 that allows for user selection of which tool to use in adding telestration and/or animation to the media composition 302. Some examples tools include, but are not limited to, a pencil tool, a marker tool, a highlighter tool, a paintbrush tool, a spray can tool, a shape tool, a graphics selection tool, a graphics search tool, etc.

User interface 300 includes a size selection tool 306 which allows a user to select a size of a corresponding tool or shape for adding telestration and/or animation to the media composition 302. In addition, user interface 300 includes a color selection tool 308 for receiving user input selecting a color to use for adding the telestration and/or animation to the media composition 302.

In one approach, user interface 300 may be implemented on a touchscreen display, and user input to the playback controls 318, time indicator 310, size selection tool 306, and/or color selection tool 308 may be received via finger touch input, stylus touch input, and/or hover input. A hover input occurs when a user hovers close to the touchscreen display but does not actually contact the touchscreen display, which may cause a different action to be taken versus a touch contact. Moreover, swipe inputs and multiple tap inputs may also be received via the touchscreen display and may result in different actions to be taken versus a single touch contact.

Figure 3B:
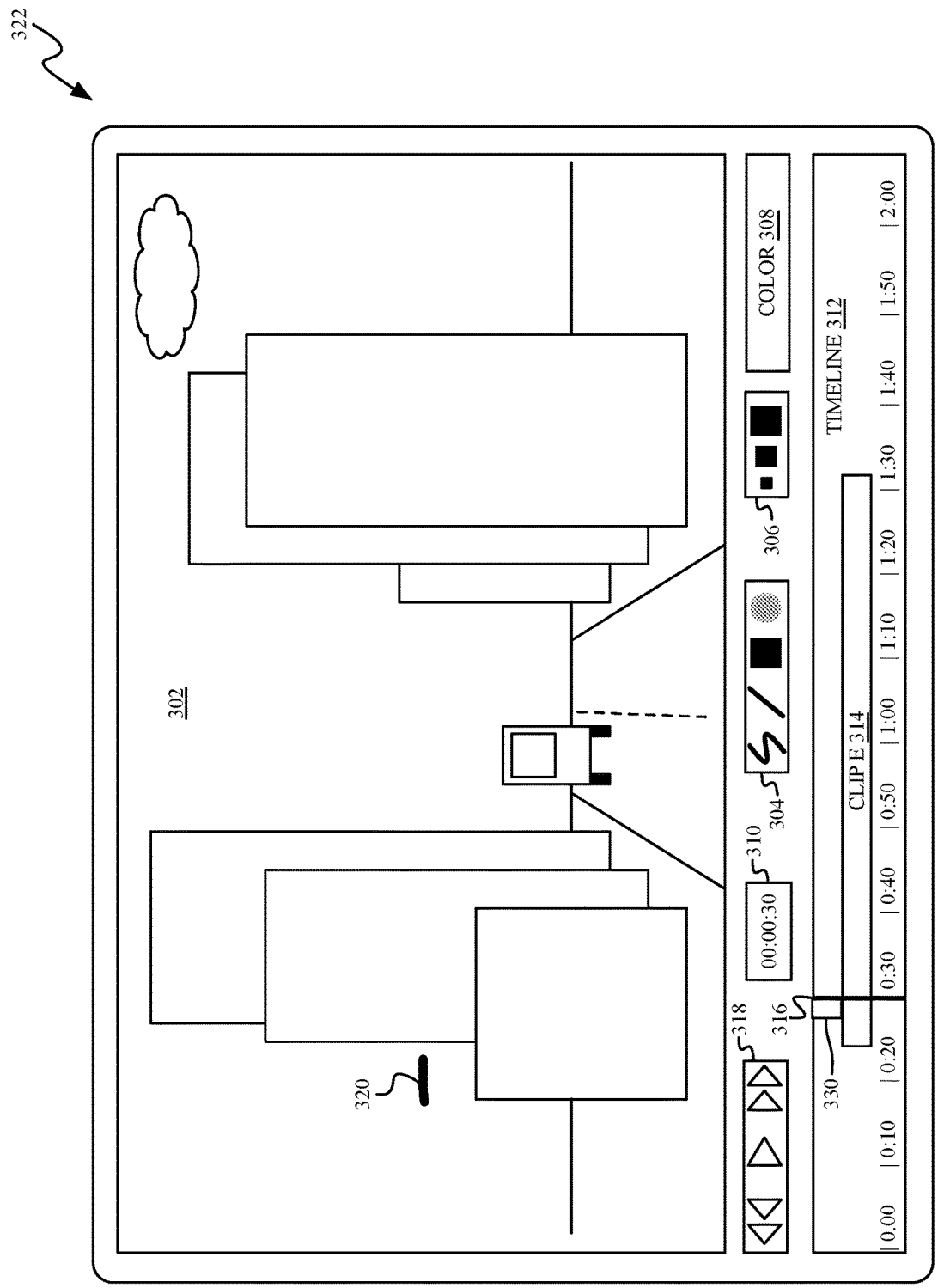

In FIG. 3B, user interface 322 shows that a user has started to draw upon the touchscreen above one of the buildings on the left side of the street, resulting in a telestration 320 being displayed overlaid on the media composition 302. This user input is shown, as an example, as a dark freehand line that is being drawn by a user's finger, by dragging the finger from an initial contact position on the touchscreen away from the initial contact position.

Timeline 312 shows that the touch input started at the 00:00:28 mark and has continued to the current frame being shown at the 00:00:30 mark. As a result of this touch input, the system has generated clip F 330 that captures the telestration 320 and added it to the timeline 312, time synchronized based on when the touch input started at 00:00:28. As long as the touch input continues, the system will continue to add to clip F 330 capturing the movement of the touch input upon the touchscreen, and continue to expand the telestration 320 displayed overlaid on the media composition 302.

Figure 3C:
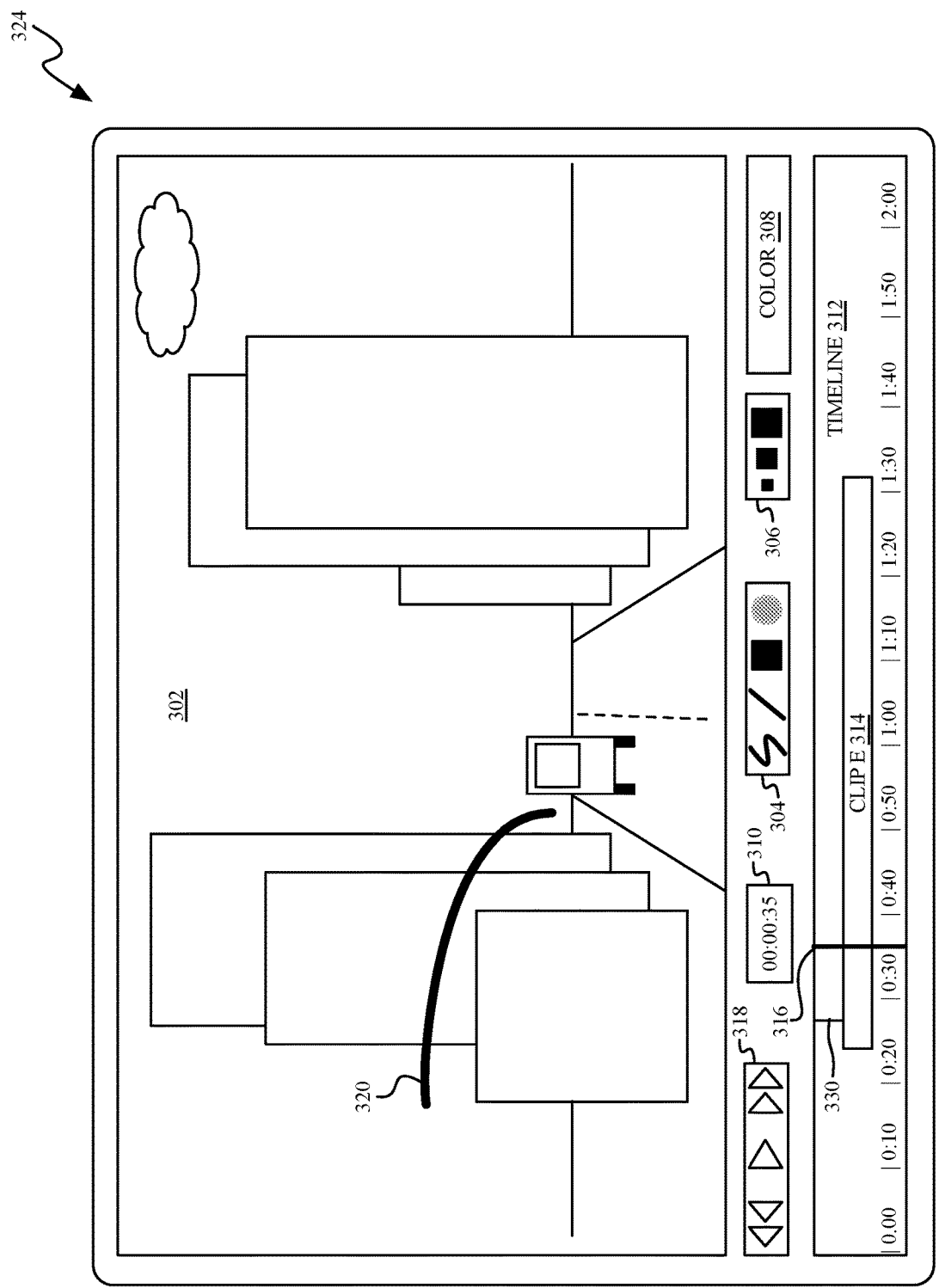

In FIG. 3C, user interface 324 shows that the user has continued the touch input to begin to encircle the building on the left side of the street, resulting in the telestration 320 growing in size based on the movement of the user's finger in contact with the touchscreen. Time indicator 310 shows that the current time is 00:00:35, and the timeline 312 shows that media clip F 330 has grown in duration to match the continued touch input to the current frame being shown at the 00:00:35 mark, based on the position of the playhead indicator 316 along the timeline 312.

Figure 3D:
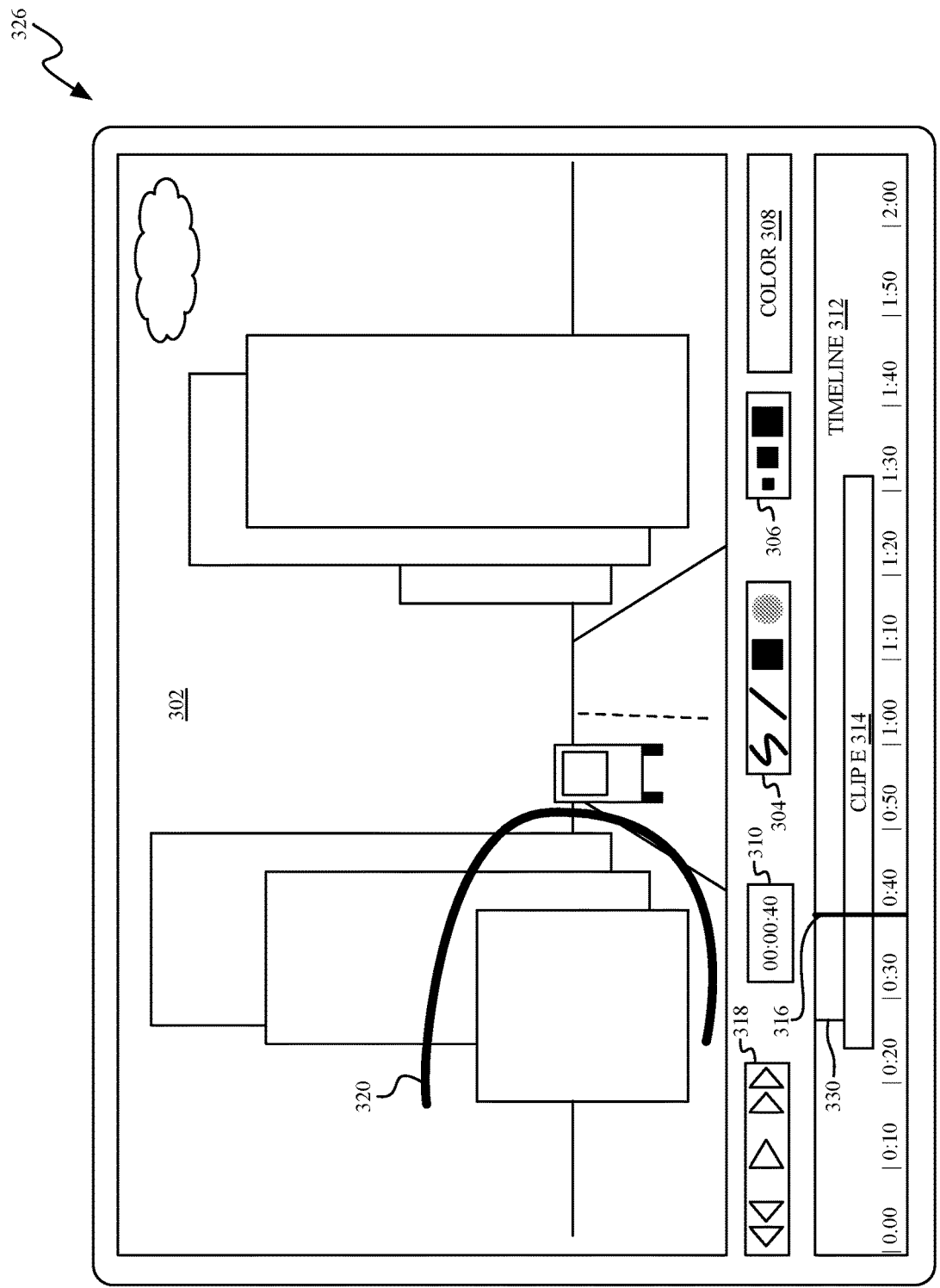

In FIG. 3D, user interface 326 shows that the user has continued the touch input to wrap around the lower portion of the building on the left side of the street, resulting in the telestration 320 continuing to grow in size based on the movement of the user's finger in contact with the touchscreen. Time indicator 310 shows that the current time is 00:00:40, and the timeline 312 shows that media clip F 330 has continued to grow in duration to match the continued touch input to the current frame being shown at the 00:00:40 mark, based on the position of the playhead indicator 316 along the timeline 312.

Figure 3E:
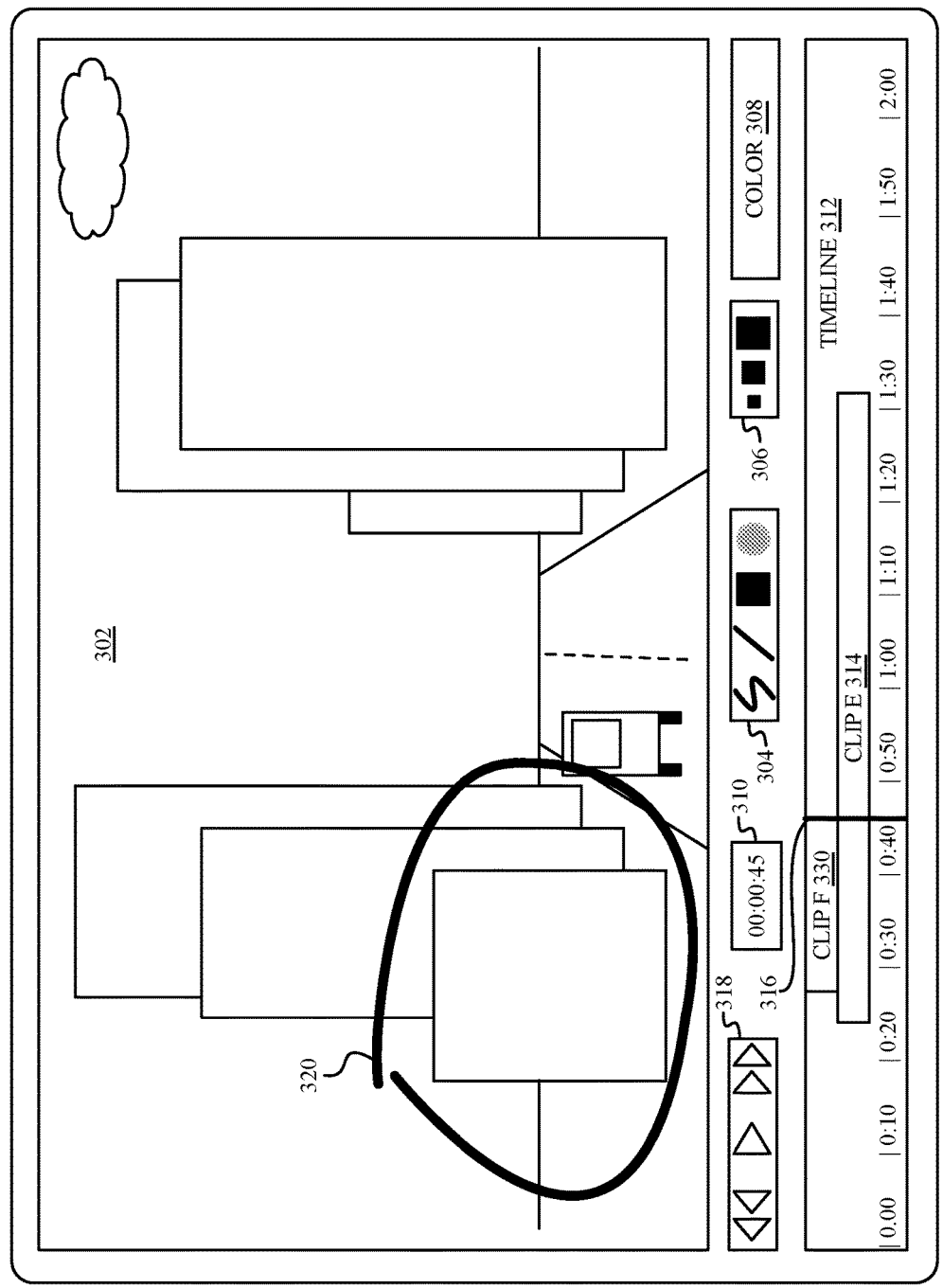

In FIG. 3E, user interface 328 shows that the user has completed the touch input to completely encircle the building on the left side of the street, resulting in the telestration 320 resembling a loosely drawn circle around the building. Time indicator 310 shows that the current time is 00:00:45, and the timeline 312 shows that media clip F 330 has continued to grow in duration to match the completed touch input at the current frame being shown at the 00:00:45 mark, based on the position of the playhead indicator 316 along the timeline 312.

In one embodiment, telestration 320 may cease to be captured once the touch input ceases and no longer be visible overlaid on media composition 302 after conclusion of playback of clip F 330. In another embodiment, telestration 320 may remain as it has been captured after the touch input ceases and continue to be visible overlaid on media composition 302, continuing to add to the duration of clip F 330. In this embodiment, the user may indicate when to stop displaying telestration 320 in the media composition 302, thereby completing creation of clip F 330 at the point in time when the user chooses to stop displaying the telestration 320.

In one embodiment, a telestration 320 may remain visible for a default duration after cessation of the touch input, and/or a user selected duration may be used to keep the telestration 320 visible for the selected amount of time after the touch input ceases.

Once clip F 330 is generated, it may be modified, moved, and/or deleted in any way through the user interface 300, as described previously. Moreover, the various user interface elements 304, 306, 308 may be used for indicating the modifications to an existing telestration 320 in one approach.

As the playhead indicator 316 is moved along clip F 330, the telestration 320 will be shown in the various different states of its creation, based on the currently selected time or frame of the media composition 302. In this way, the telestration 320 can act as a dynamic addition to the media composition 302 and be manipulated to further refine its appearance, style, size, position, etc., even after generation of the telestration 320 has been completed.

For example, if a user wants to move where a portion of the telestration 320 appears in a certain frame of the media composition 302, the user can select the line and move it in a particular frame. This movement, in an embodiment, will be reflected in all other frames of the media composition 302 to reflect that the telestration 320 was drawn with the line in the position the user has later selected.

In another example, if a user wants a telestration 320 that was drawn with a thick black line to instead be displayed with a dashed red line, the user may select the red color option, dashed line option from tool selector interface element 304 and the red color from the color selection tool 308. Then, the user can select the telestration 320 from the display of the media composition 302, or select clip F 330 from the timeline 312, to impart the new selections to the already generated telestration 320.

Figure 4A:
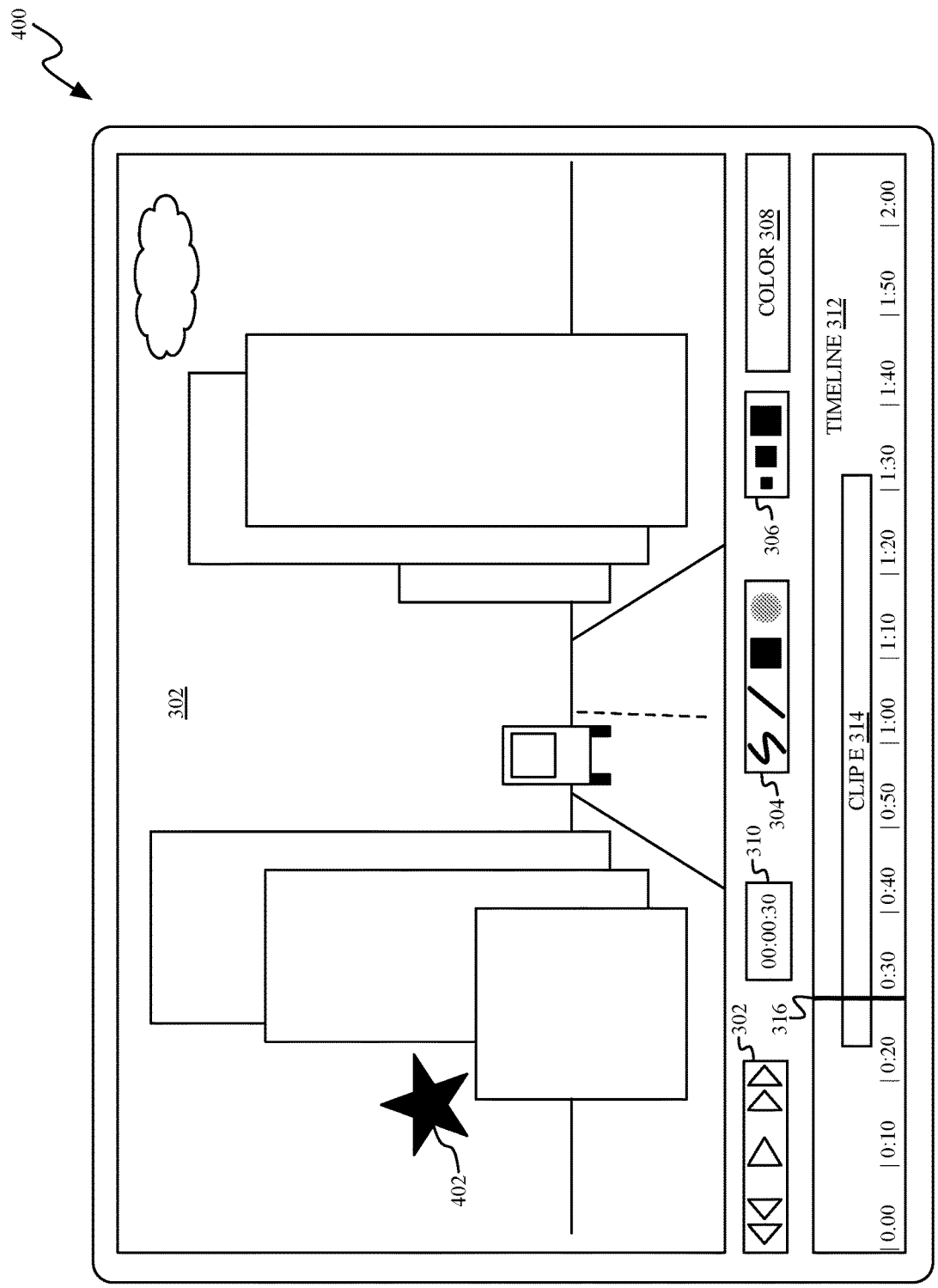
FIGS. 4A-4C show an example set of user interfaces for generating an animation.
Figure 4B:
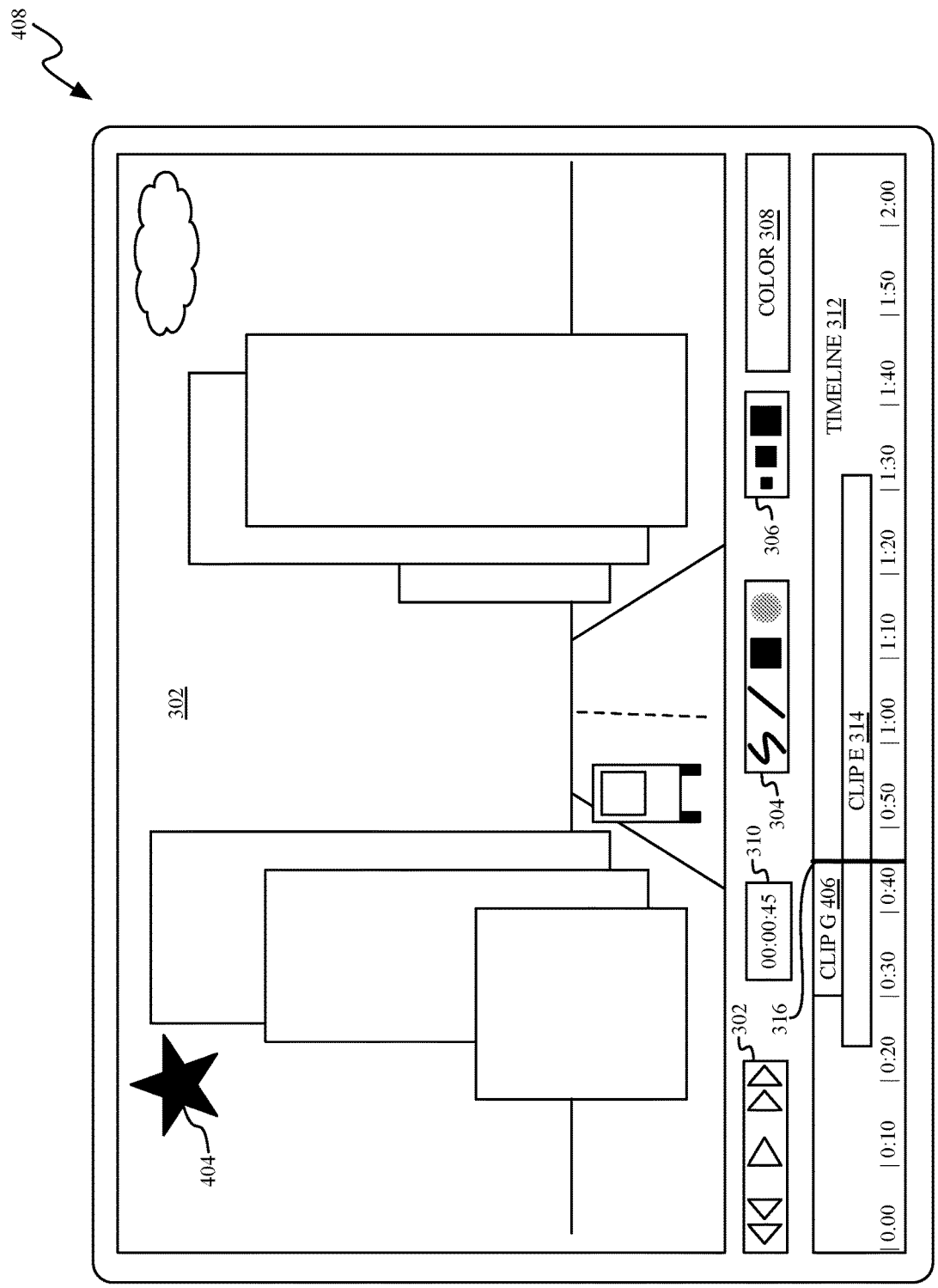
Figure 4C:
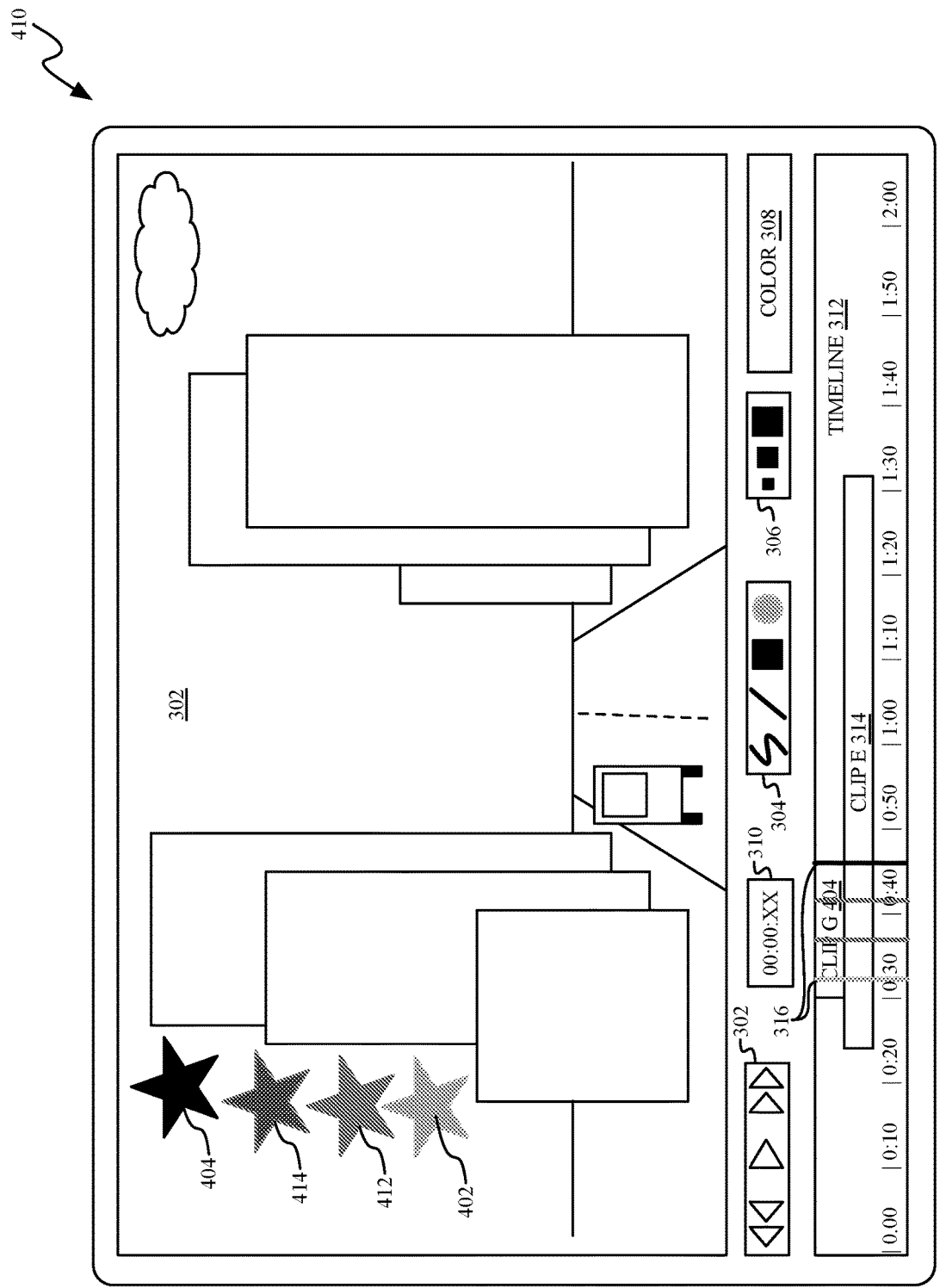

FIGS. 4A-4C show an example set of user interfaces for generating an animation, in one or more embodiments. In FIG. 4A, user interface 400 shows a particular frame of the media composition 302 that is being played back. This particular frame is from clip E 314 and occurs at the 00:00:30 mark of the media composition 302, as indicated by the playhead indicator 316 along the timeline 312. As previously described, the frame shows a vehicle travelling along the street between buildings. User interface 400 may include some or all of the user interface elements previously described for user interface 300 in FIG. 3A.

Referring again to FIG. 4A, user interface 400 shows that a user has added an image object (e.g., a graphical representation or graphic) of a star on a portion of the media composition 302, in a first position 402 above the building on the left side of the street. The user may have selected this shape from the tools user interface element 304 in one approach, prior to touching the portion of the touchscreen display above the building on the left side of the street to place the star in this first position 402. This action has been performed at the 00:00:30 mark of the media composition 302, and an association between the first position 402, the shape and appearance of the star, and this particular frame of the media composition 302 may be stored by the system.

In FIG. 4B, user interface 408 shows that the user has selected a second position 404 for the star. This second position 404 is located to the left of the last building on the left side of the street. The second position 404 for the star has been indicated by the user at a frame of the media composition 302 corresponding to the 00:00:45 mark of the presentation. Based on the selection of this second position 404 for the star, the system generates a clip G 406 that extends from the frame associated with selection of the first position 402 to the frame associated with the second position 404.

The system generates a first frame of an animation based on the user input selecting the first position 402 for the star and a second frame of the animation based on the user input selecting the second position 404 for the star. The first frame of the animation displays the star at the first position 402 while the second frame of the animation displays the star at the second position 404.

As shown in FIG. 4C, user interface 410 shows an example animation of the star from the first position 402 to the second position 404. To achieve this animation, the system creates a set of frames that visualize the transition of the star from the first position 402 to the second position 404. Display of the set of frames are simplified in FIG. 4C to only show two of the set of frames, with the star located at intermediate positions 412 and 414 in these two frames, with associated time marks being shown along the timeline 312 by the playhead indicator 316. However, the set of frames actually generated to create the animation will include substantially more frames than just the two frames shown in FIG. 4C, e.g., one frame for each frame of the media composition 302 that will be played between time marks 00:00:30 and 00:0045.

In some of the set of frames, the star may not move from a previous frame to indicate slow movement or a stationary position. Once the set of frames are created, the system assembles, in order, the first frame, the set of frames, and the second frame to form the animation of the star moving upward during playback of the media compensation 302.

The transition of the star from the first position 402 to the second position 404 is shown as linear movement. However, in one or more embodiments, interpolated movement along one or more curves on a path from the first position 402 to the second position 404 may be used by the system to generate the animation. In this case, the system generates the set of frames to visualize the interpolated movement along the one or more curves on the path from the first position 402 to the second position 404.

The user may select which type of movement to use for the transition of the star from the first position 402 to the second position 404 in one embodiment.

In one embodiment, the animation may be overlaid on at least one video clip of the media composition 302 (e.g., the video of the vehicle travelling along the street between the buildings).

According to one embodiment, a duration for the animation may be selected, separate from or in conjunction with indication of the frames on which the first and second positions have been indicated. The animation is generated to coincide with the duration in one approach. For example, the duration corresponds to a period of time between playback of the first frame and the second frame during a playback of the media composition 302. According to one embodiment, a number of the set of frames corresponds to the duration for the animation.

In an approach, the system may add the animation to the media composition 302, and present playback of the media composition 302 in which the animation is initiated when playback of the first frame is initiated during the playback of the media composition 302 and the animation ceases subsequent to playback of the second frame during the playback of the media composition 302.

In one embodiment, the animation may remain visible during playback of the media composition 302 after the star has moved to the second position 404 overlaid on media composition 302, continuing to add to the duration of clip G 404. In this embodiment, the user may indicate when to stop displaying the animation in the media composition 302, thereby completing creation of clip G 404 at the point in time when the user chooses to stop displaying the animation.

In one embodiment, the animation may remain visible for a default duration after the star is placed in the second position 404, and/or a user selected duration may be used to keep the animation visible for the selected amount of time after the star is placed in the second position 404.

Once clip G 404 is generated, it may be modified, moved, and/or deleted in any way through the user interface 400, as described previously. Moreover, the various user interface elements 304, 306, 308 may be used for indicating the modifications to an existing animation in one approach.

As the playhead indicator 316 is moved along clip G 404, the animation will be shown in the various different states of its creation, based on the currently selected time or frame of the media composition 302. In this way, the animation can act as a dynamic addition to the media composition 302 and be manipulated to further refine its appearance, style, size, position, etc., even after generation of the animation has been completed.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 5:
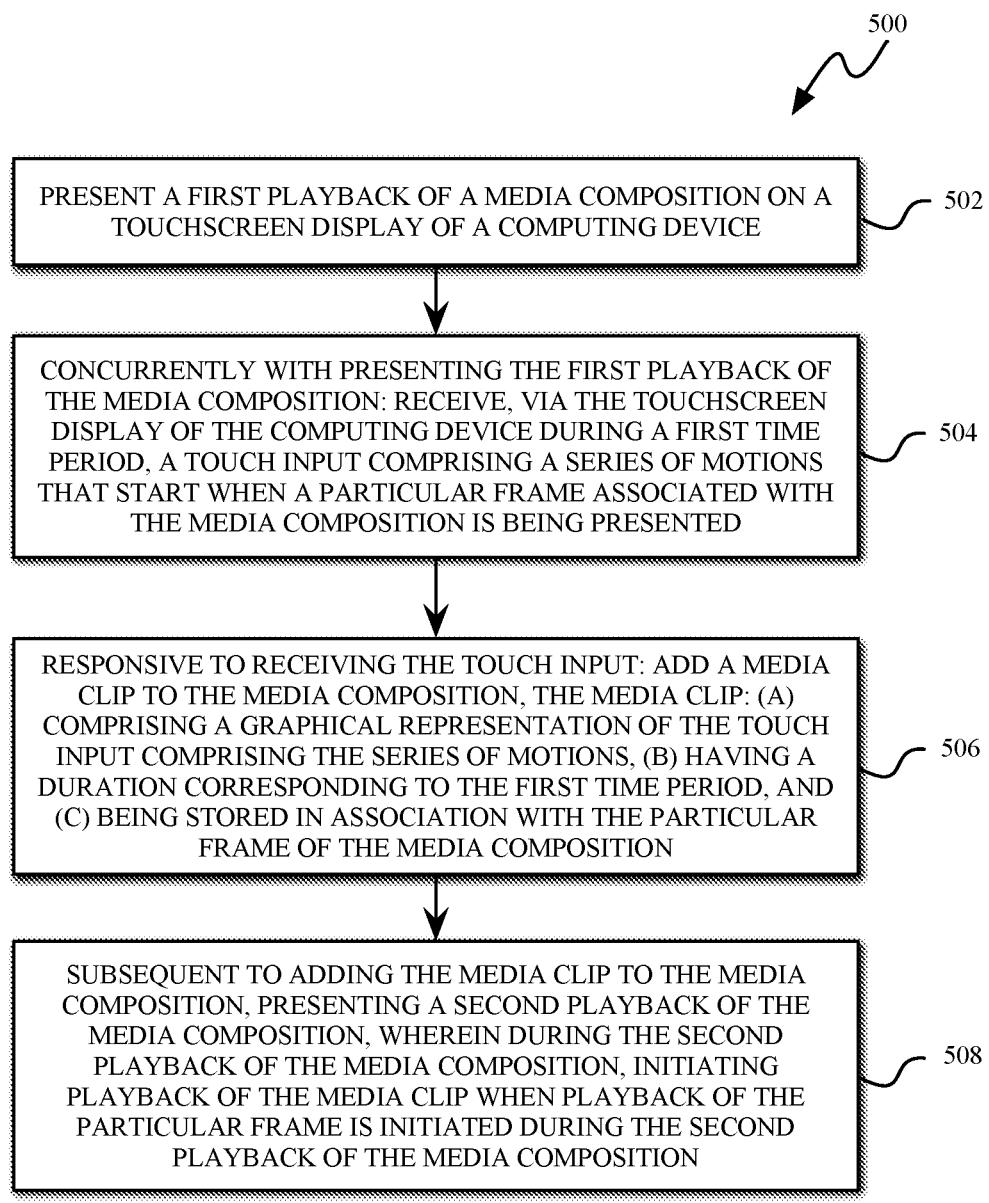
FIG. 5 is a flow diagram of an example process for generating a media clip showing a telestration based on touch input.

FIG. 5 is a flow diagram of an example process 500 for generating a media clip showing a telestration based on touch input, in one or more embodiments. More or less operations than those shown and described herein may be included in process 500 in various approaches. For the remainder of the description of FIG. 5, process 500 will be described as being performed by a computing device having at least one hardware processor for performing the various operations.

In operation 502, the computing device presents a first playback of a media composition on a touchscreen display of the computing device. The first playback shows the media composition prior to any addition of content that is performed in process 500. Playback may be initiated by selection of a user interface element on the touchscreen display that prompts the media composition to begin playing.

In operation 504, the computing device receives, via the touchscreen display of the computing device during a first time period, a touch input comprising a series of motions that start when a particular frame associated with the media composition is being presented. This touch input may define a telestration to be included in the media composition. The touch input is received concurrently with presenting the first playback of the media composition in one embodiment. The first time period begins when the touch input begins and ends when the touch input ceases, and may be used to determine a duration for subsequent presentation of the telestration within the media clip when playing back the media composition.

In operation 506, the computing device, responsive to receiving the touch input, adds a media clip to the media composition based on the touch input (e.g., the media clip includes the telestration, possibly with a transparent background for overlaying video portions of the media composition). The media clip is generated, by the computing device, to include a graphical representation of the touch input that includes the series of motions that has a duration corresponding to the first time period. The computing device may store the media clip, in association with the particular frame of the media composition, to a data repository.

According to one embodiment, the media clip may consist of a single video track including the graphical representation of the touch input. In other words, the media clip may consist of the telestration.

In operation 508, the computing device, subsequent to adding the media clip to the media composition, presents a second playback of the media composition which includes the media clip. During the second playback of the media composition, playback of the media clip is initiated when playback of the particular frame is initiated during the second playback of the media composition, in an embodiment.

Once the media clip (including the telestration) is generated and displayed to the timeline, it may be moved, clipped, expanded, or otherwise manipulated via user interaction with the touchscreen display, to further modify the media composition and/or the telestration included in the media clip.

In one embodiment, during the second playback of the media composition, the media clip is played for the duration corresponding to the first time period. In another embodiment, the user may select a duration for playback of the media clip that may be different from the duration corresponding to the first time period, and/or may be a duration that is proportional to the duration corresponding to the first time period.

According to an embodiment, the media clip may be overlaid on at least one video clip of the media composition. In this way, the media clip may be superimposed over the video clip using a transparent background, such that all portions of the video clip that are not obscured by the telestration are visible during playback, with the telestration being overlaid on any video content there behind.

In an approach, the computing device may receive user input modifying the duration of the media clip. This user input may be received via the touchscreen display, (e.g., via selection of a menu item, by stretching/shrinking the media clip on the timeline, etc.), using a human interface device (e.g., keyboard, mouse, etc.), via a microphone for voice commands, etc. In response to the user input modifying the duration of the media clip, the computing device adjusts the media clip to have a second duration based on the user input. The adjusting may include cropping the original media clip to remove a portion of the media content of the original media clip, expanding the original media clip to stretch the media content therein, adding additional media content to the original media clip, etc.

In a further approach, subsequent to adjusting the media clip to have the second duration, the computing device may present a playback of the media composition in which the media clip is played for the second duration during playback of the media compensation.

In another approach, the computing device may receive user input modifying frames of the media clip to generate a modified version of the media clip. Any conceivable modification may be made to the media clip, such as modifying color(s), modifying sharpness, modifying brightness, modifying audio levels, changing contrast, applying a filter, adding media content, changing a size of the telestration, etc. Subsequent to modifying frames of the media clip, the computing device may present a playback of the media composition in which the modified version of the media clip is played in place of the original media clip. In an embodiment, the modified media clip may be played for the duration corresponding to the first time period.

In various approaches, the user input that modifies the media clip may include, but is not limited to, any of the following: clipping the media clip to remove at least one portion of the media clip, shrinking the media clip to condense content of the media clip during playback of the modified media clip, expanding the media clip to stretch the content of the media clip during playback of the modified media clip, changing a color of the graphical representation of the touch input (i.e., the telestration), changing a thickness of the telestration, and/or changing a style of the telestration.

According to one embodiment, concurrently with presenting the playback of the media composition with the media clip, the computing device may receive, via the touchscreen display of the computing device during a second time period, a second touch input comprising a second series of motions that start when a second frame associated with the media composition is being presented. This second touch input may define a second telestration to be included in the media composition. Responsive to receiving the second touch input, the computing device adds a second media clip to the media composition, the second media clip including a second graphical representation of the second touch input comprising the second series of motions (e.g., the second telestration). In one embodiment, the second media clip may have a second duration that corresponds to the second time period (e.g., proportional). Moreover, the computing device may store the second media clip in association with the second frame of the media composition.

In one or more embodiments, subsequent to adding the second media clip to the media composition, the computing device may present a playback of the media composition in which playback of the second media clip is initiated when playback of the second frame is initiated during the playback of the media composition.

According to an approach, prior to or concurrent with receiving the touch input defining the telestration, the computing device may receive a user input selecting at least one of: a color, a style, a size of tip, and a duration for the telestration. In this approach, the graphical representation included in the media clip (e.g., the telestration) is displayed in accordance with the user input during the second playback of the media composition. In other words, the telestration is shown on the touchscreen display with the selected color, style, size, and/or for the selected duration when playing back the media composition.

Figure 6:
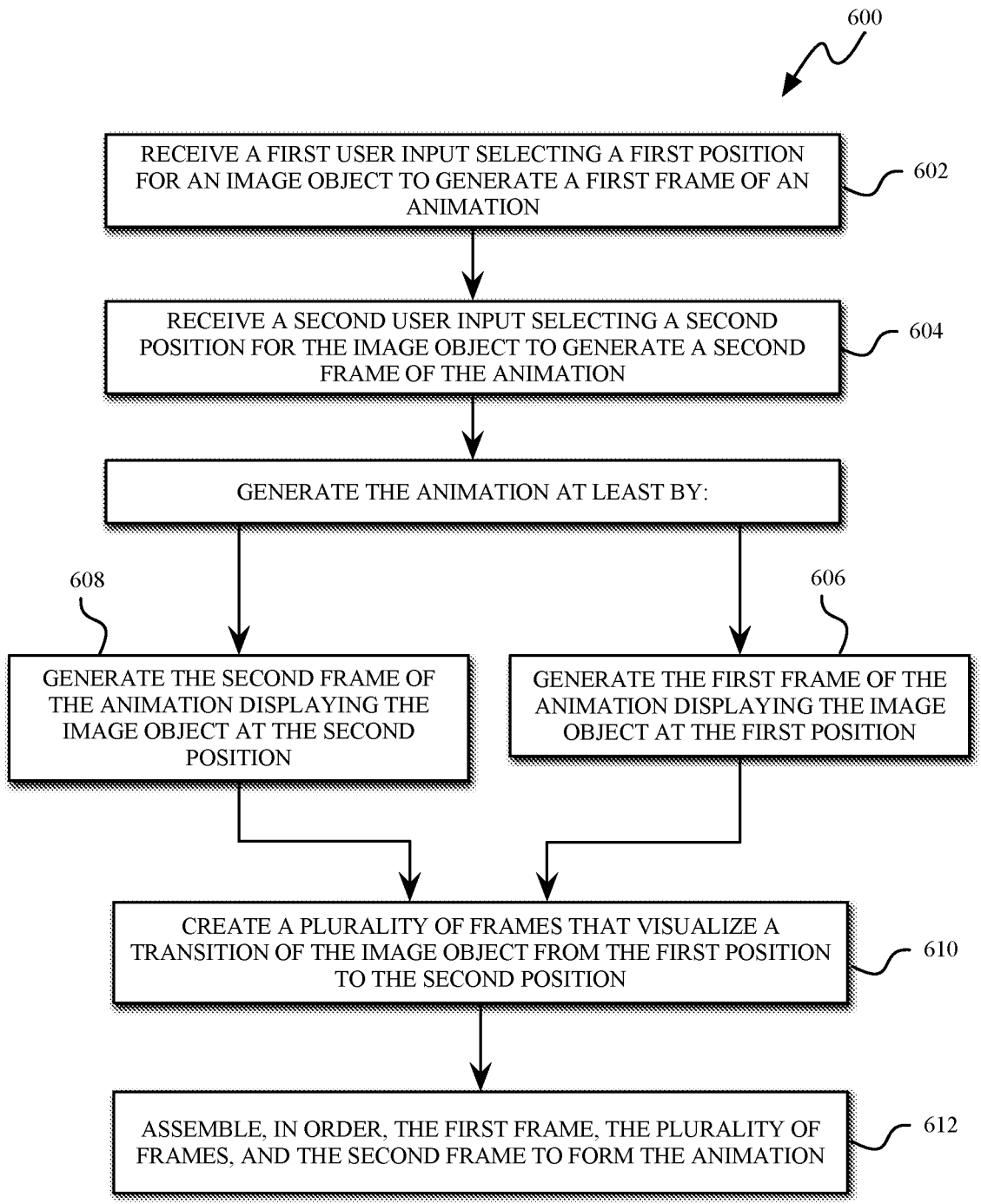
FIG. 6 is a flow diagram of an example process for generating an animation based on touch input.

FIG. 6 is a flow diagram of an example process 600 for generating an animation based on touch input, in one or more embodiments. More or less operations than those shown and described herein may be included in process 600 in various approaches. For the remainder of the description of FIG. 6, process 600 will be described as being performed by a computing device having at least one hardware processor for performing the various operations.

In operation 602, the computing device receives a first user input selecting a first position for an image object to generate a first frame of an animation. The image object may include letters, numbers, emojis, stock images, graphics, icons, common shapes, images retrieved via a search, telestrations, etc., in various embodiments. The first position may be selected by a user tapping on a portion of the touchscreen display where the user wants the image object to start for definition of an animation. The first position may be relative to a currently playing media composition, in one approach, or on a screen for building animations that is unrelated to the media composition.

In operation 604, the computing device receives a second user input selecting a second position for the image object to generate a second frame of the animation. The second position may be selected by the user tapping on a portion of the touchscreen display where the user wants the image object to end for definition of the animation. The second position may be relative to a currently playing media composition, in one approach, or on a screen for building animations that is unrelated to the media composition.

Operations 606-612 are directed to generating the animation. In operation 606, the computing device generates the first frame of the animation. In the first frame of the animation, the image object is displayed at the first position. In an approach, the background of the animation (and in each individual frame thereof) may be transparent to allow the animation to be displayed overlaid on other content, such as the media composition.

In operation 608, the computing device generates the second frame of the animation. In the second frame, the image object is displayed at the second position.

In operation 610, the computing device creating a plurality of frames that visualize a transition of the image object from the first position to the second position.

In one or more embodiments, the computing device may receive a user input that specifies how the transition should be shown. In one embodiment, the computing device may receive a user input selecting interpolated movement along one or more curves on a path from the first position to the second position to define the transition. In this embodiment, the plurality of frames visualize the interpolated movement along the one or more curves on the path from the first position to the second position. In other words, the computing device creates movement for the image object that smoothly moves along a curved line or lines during the transition to the second position.

According to one embodiment, the computing device may receive a user input that specifies linear movement along one or more straight lines on a path from the first position to the second position to define the transition. In this embodiment, the plurality of frames visualize the linear movement along the one or more straight lines on the path from the first position to the second position. In other words, the computing device creates movement for the image object that moves along one or more straight lines during the transition to the second position.

In operation 612, the computing device assembles the first frame, the plurality of frames, and the second frame in this order to form the animation. Additional positions may be specified by the user for placement of the image object during the animation, in which case the animation will be created to include the image object at these additional positions on the display.

In an embodiment, the computing device may receive a user input selecting a third position for the image object. Based on this third user input, the computing device generates a third frame of the animation that is positioned between the first frame and the second frame. In this embodiment, the computing device creates the plurality of frames that visualize the transition of the image object from the first position to the second position by creating a first subset of the plurality of frames that visualize a first portion of the transition of the image object showing the image object transitioning from the first position to the third position and creating a second subset of the plurality of frames that visualize a second portion of the transition of the image object showing the image object transitioning from the third position to the second position. Moreover, the animation is formed by assembling, in order, the first frame, the first subset of the plurality of frames, the third frame, the second subset of the plurality of frames, and the second frame.

In a particular embodiment, the computing device may receive a user input selecting a duration for the animation. In this embodiment, a number of the plurality of frames that the computing device generates will correspond to the duration for the animation.

In one or more approaches, the duration may be selected based on receiving the first user input in association with a first frame of a media composition and receiving the second user input in association with a second frame of the media composition. The corresponding frames of the media composition may be used to determine the duration of the animation, for example, the duration may correspond to a period of time between playback of the first frame and the second frame during a playback of the media composition.

In an embodiment, the computing device may add the animation to the media composition. In an approach, the animation may be overlaid on at least one video clip of the media composition. Subsequent to adding the animation to the media composition, the computing device may present a playback of the media composition in which the animation is initiated when playback of the first frame is initiated during the playback of the media composition. Moreover, the animation ceases subsequent to playback of the second frame during the playback of the media composition.

In a further embodiment, the computing device may receive a user input modifying the duration of the animation. In this case, the computing device may adjust the animation to have an adjusted duration based on the user input. Any subsequent playback of the media composition will result in the animation being presented for the adjusted duration.

In one embodiment, the computing device may receive user input modifying one or more frames of the animation. The computing device will generate a modified version of the animation based on the user input. Any subsequent playback of the media composition will result in the modified version of the animation being presented in place of the original animation.

In one or more embodiments, the user input may include any of the following: clipping the animation to remove at least one portion of the animation, shrinking the animation to condense content of the animation during playback of the modified version of the animation, expanding the animation to stretch the content of the animation during playback of the modified version of the animation, changing a color of the image object, changing a size of the image object, and/or changing a style of the transition of the image object from the first position to the second position, etc.

In an approach, prior to or concurrent with receiving the first user input specifying the first position, the computing device may receive a user input selecting an attribute for the animation. The attribute may include, but is not limited to, a color, a style, a size, an effect, a duration, etc. During playback of the animation, the image object is displayed in accordance with the selected attribute for at least a portion of the animation. The user input may also specify which portion of the animation to apply the attribute, such as first 1 second, first 5 seconds, last 5 seconds, last 1 second, etc.

Once the animation is generated, the media clip representing the animation shown on the timeline may be moved, clipped, expanded, or otherwise manipulated via user interaction with the touchscreen display, to further modify the media composition and/or the animation included in the media composition.

In one embodiment, the user interface for generating the animation and/or playback of the media composition may include a timeline for easy manipulation of the current playback time by adjusting a position of a playback head indicator along a timescale. The timeline displays components of the media composition as individual media clips positioned along the timeline from a starting time to an ending time for the respective media clip. Moreover, each of these clips may be movable along the timeline, such as by a drag-and-drop touch input via a touchscreen display, to reposition the clips within the media composition.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

FIGS. 7A-7G show example user interfaces for generating a telestration, in one or more embodiments. Input for generating the telestration may be provided by a user via touch input on a touchscreen display, in one or more approaches.

Figure 7A:
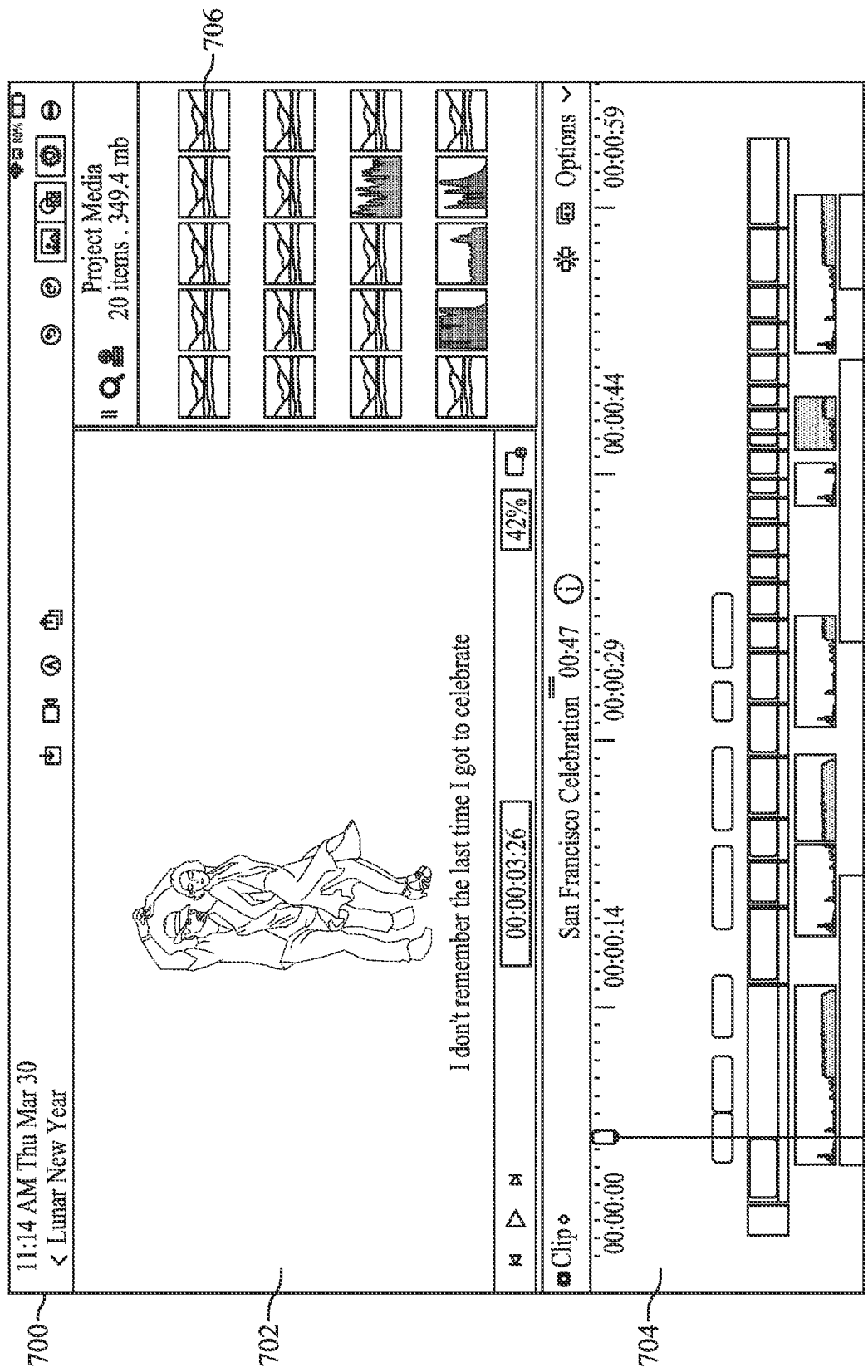

FIG. 7A shows a user interface having a main display area 702, a timeline 704, and a project media display area 706. On the timeline 704, the media composition is shown having a plurality of media clips. The main display area 702 may be playing back the media composition in one approach, or a single frame may be shown while the media composition remains paused. The playhead indicator on the timeline 704 indicates a current playback position within the media composition.

Figure 7B:
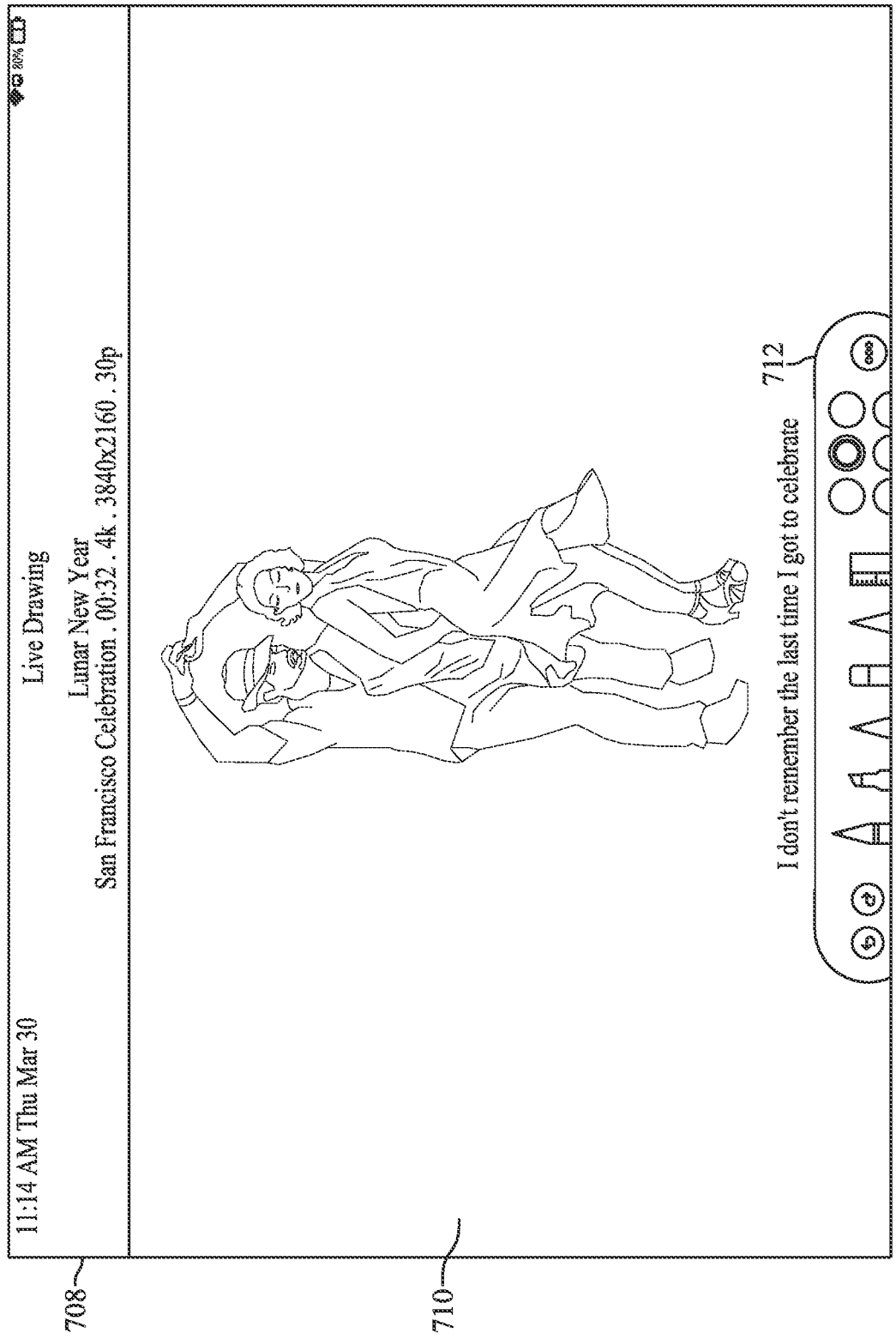

FIG. 7B shows user interface 708 where the main display area 710 has increased in size, to almost full screen, thereby removing display of the other display areas except for a media information display area showing a title and related information about the media composition being displayed in the main display area 710. Moreover, the user has accessed a user interface element 712 presenting a number of tools and options for telestrating on the main display area 710.

Figure 7C:
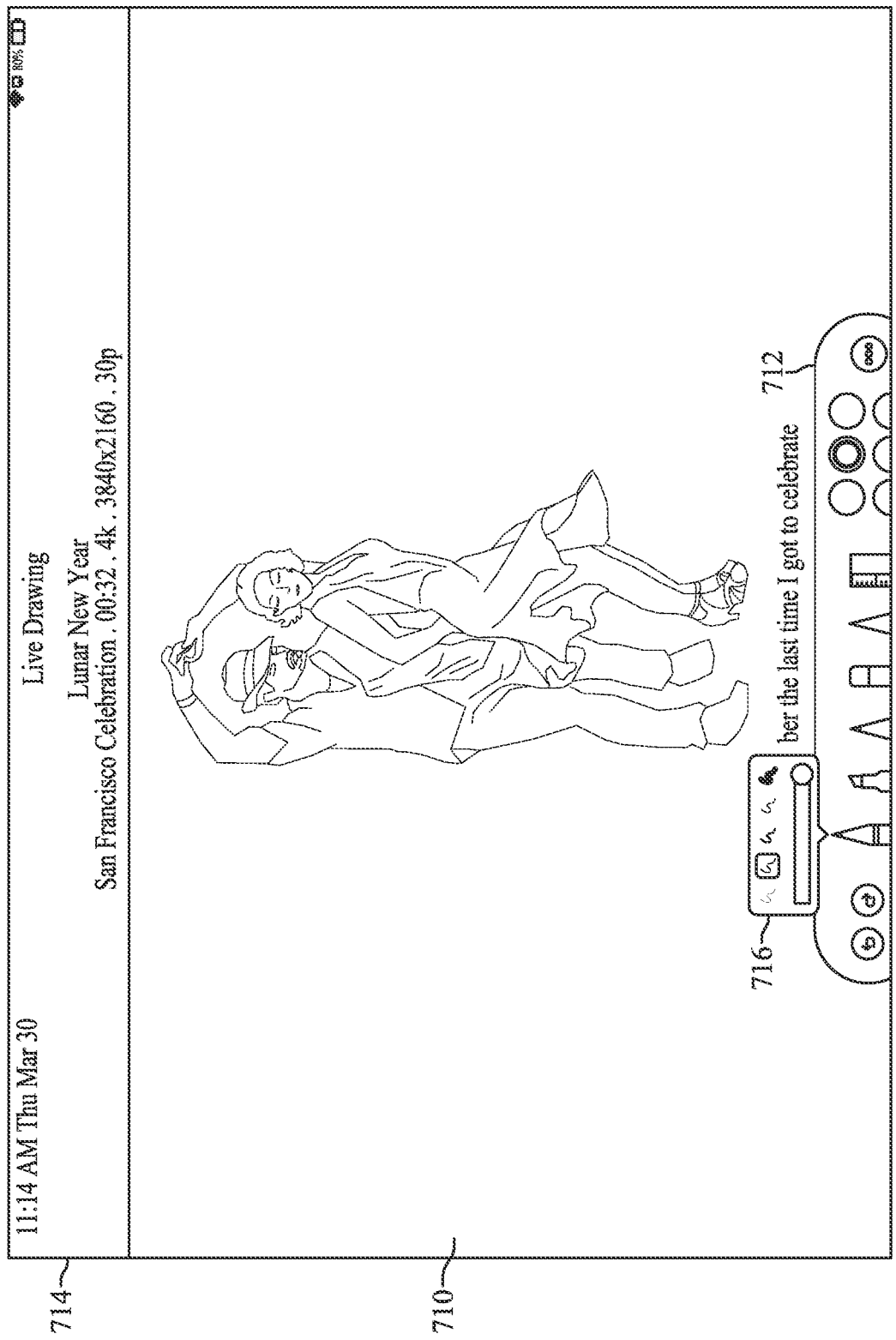

FIG. 7C shows user interface 714 where the user has selected a particular tool (e.g., a pencil drawing tool) from the user interface element 712, which presents a submenu 716 with drawing options (e.g., line thickness and opacity) for the selected tool. The user may select the options appropriate for how a telestration should appear when playing back the media composition. At any point, the user may playback the media composition in the main display area 710 and enter a telestration input using a selected tool, or enter the telestration input while the media composition is paused showing a single frame in the main display area 710.

Figure 7D:
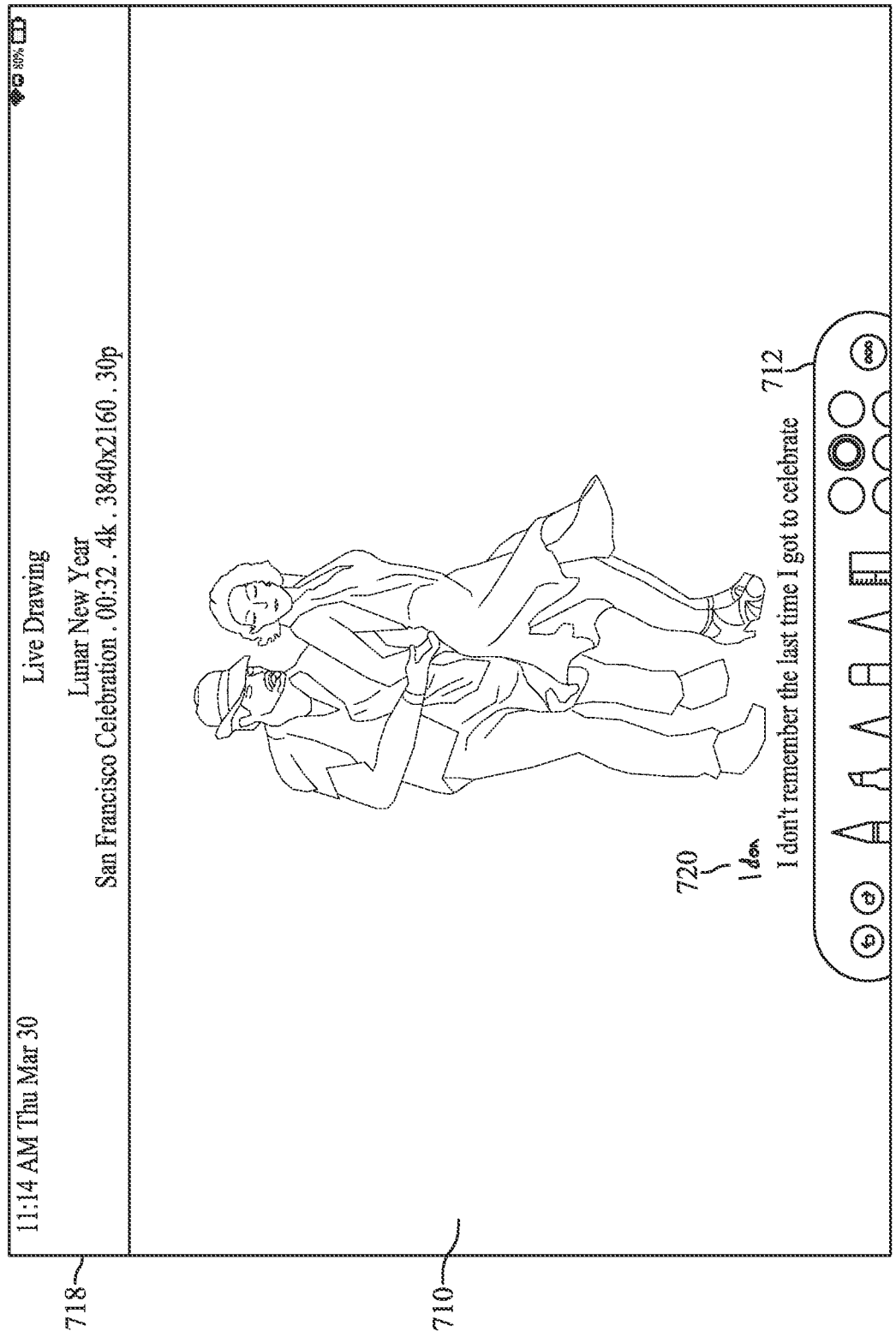

FIG. 7D shows user interface 718 where the user has begun writing the typed words shown in the main display area 710 via a touch input while playing back the media composition. The telestration 720 as it currently exists reads "I don" in the user's handwriting. The telestration 720 has an appearance in accordance with the tool selections made by the user in FIGS. 7B-7C. Moreover, the system is tracking and associating when the handwriting (telestration 720) is entered by the user with a current time index and/or frame of the media composition that is being displayed in the main display area 710 when the telestration input is entered.

FIG. 7E shows user interface 722 where the media composition continues to be played back in the main display area 710, and the user entering additional handwriting above the words, such that the telestration 720 now reads "I don't remember the l" in the user's handwriting.

Figure 7F:
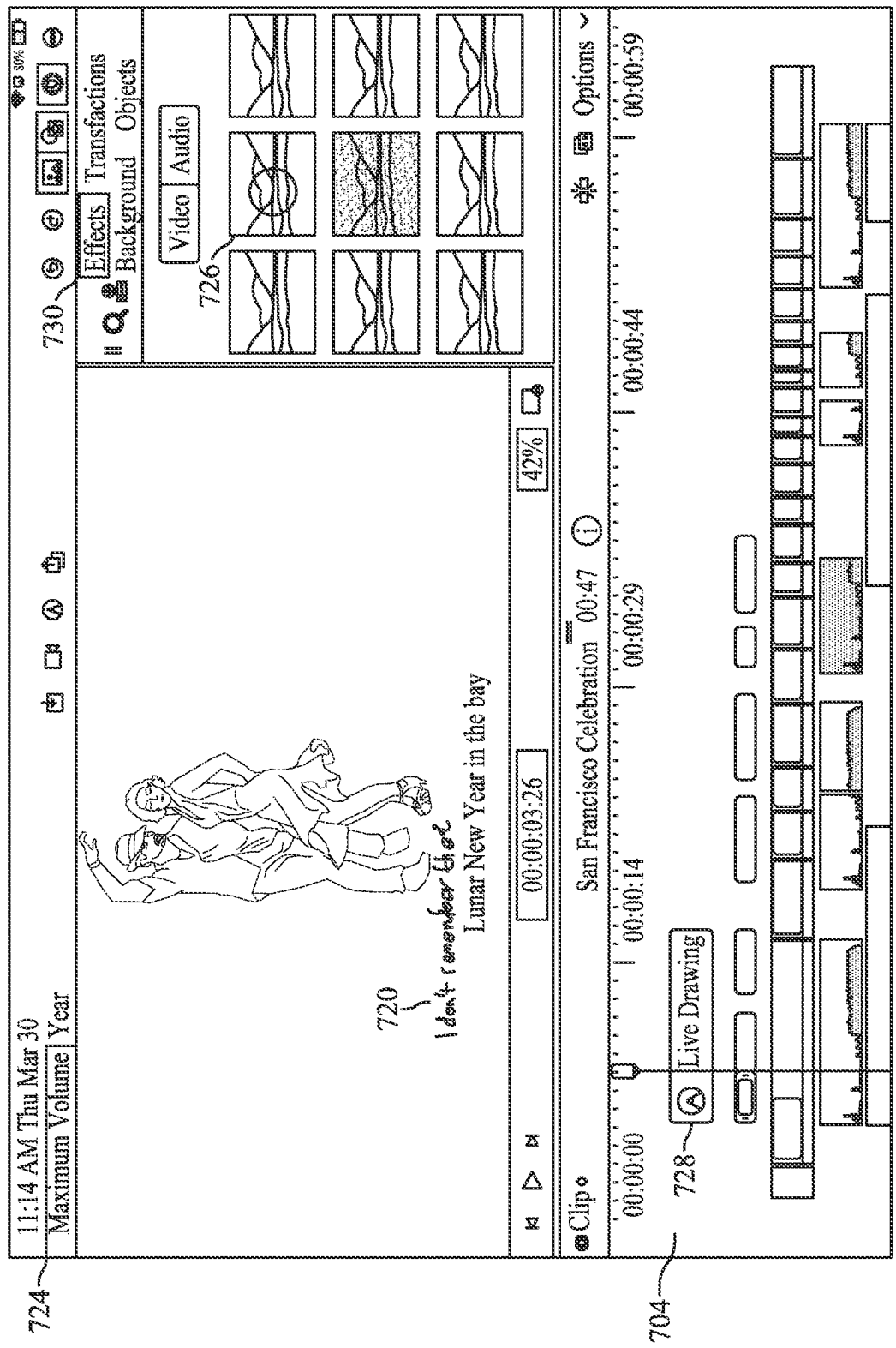

FIG. 7F shows user interface 724, where the user has transitioned back to the display arrangement showing the main display area and timeline 704. Moreover, user interface 724 presents a modification interface element 730 that shows a set of options for modifying the telestration 720 and/or frame(s) (e.g., "Effects," "Transactions," "Background," and "Objects"). The user has selected a certain effect 726 to apply to the telestration 720.

Figure 7G:
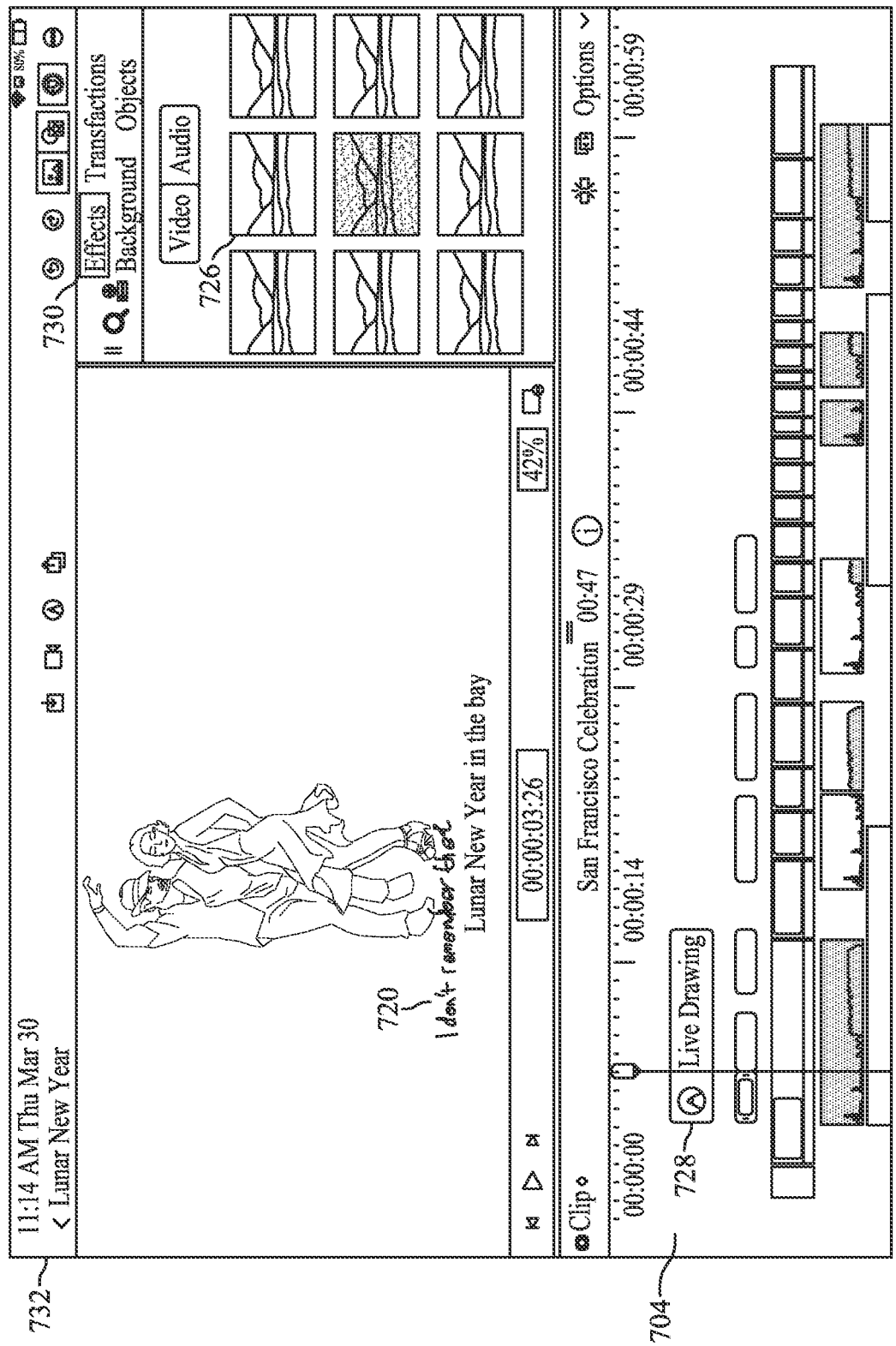

FIG. 7G shows user interface 732, where the certain effect 726 has been applied to the telestration 720, thereby altering an appearance of the handwriting above the typed words in accordance with the selected effect 726.

Although handwriting is shown as the telestration 720 in FIGS. 7A-7G, any type of user input (e.g., drawing, stamping, copying, moving, etc.) may be used to create the telestration in various approaches.

FIGS. 8A-8G show example user interfaces for generating an animation, in one or more embodiments. Input for generating the animation may be provided by a user via touch input on a touchscreen display, in one or more approaches.

Figure 8A:
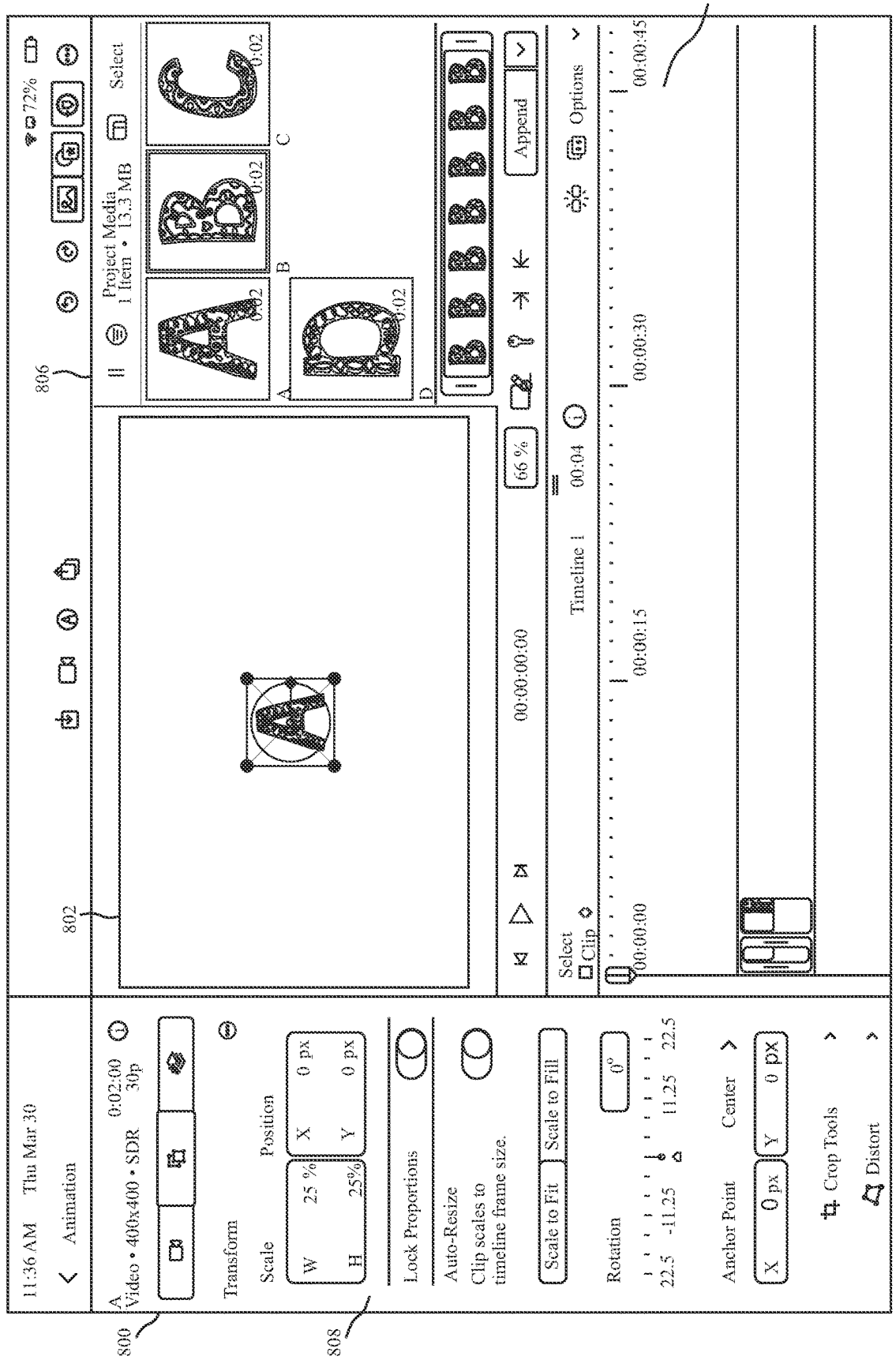
FIGS. 8A-8G show example user interfaces for generating an animation, in one or more embodiments.

FIG. 8A shows user interface 800 having a main display area 802, a timeline 804, a project media display area 806, and an animation control 808. On the timeline 804, a media composition is shown having two media clips. The main display area 802 may be playing back the media composition in one approach, or a single frame may be shown while the media composition remains paused. In this example, the user is creating the animation for use in the media composition. The playhead indicator on the timeline 804 indicates a current playback position within the media composition.

The project media display area 806 presents a number of available graphics which may be used in creating the animation. In this example, fancy versions of the letters "A," "B," "C," and "D" are shown for inclusion in an animation. Moreover, several options for each available graphic are also presented at the lower portion of the project media display area 806.

The animation control 808 presents a set of options for constructing the animation, and may be accessed throughout the creation process, in one embodiment. The main display area 802 shows a fancy letter "A," which is to be animated to show movement across the frame during playback of the media composition, as will be described here. The fancy letter "A" is shown within a guide with handles for easier movement and placement within the frame (e.g., at each axis and on a centerline therefore).

Figure 8B:
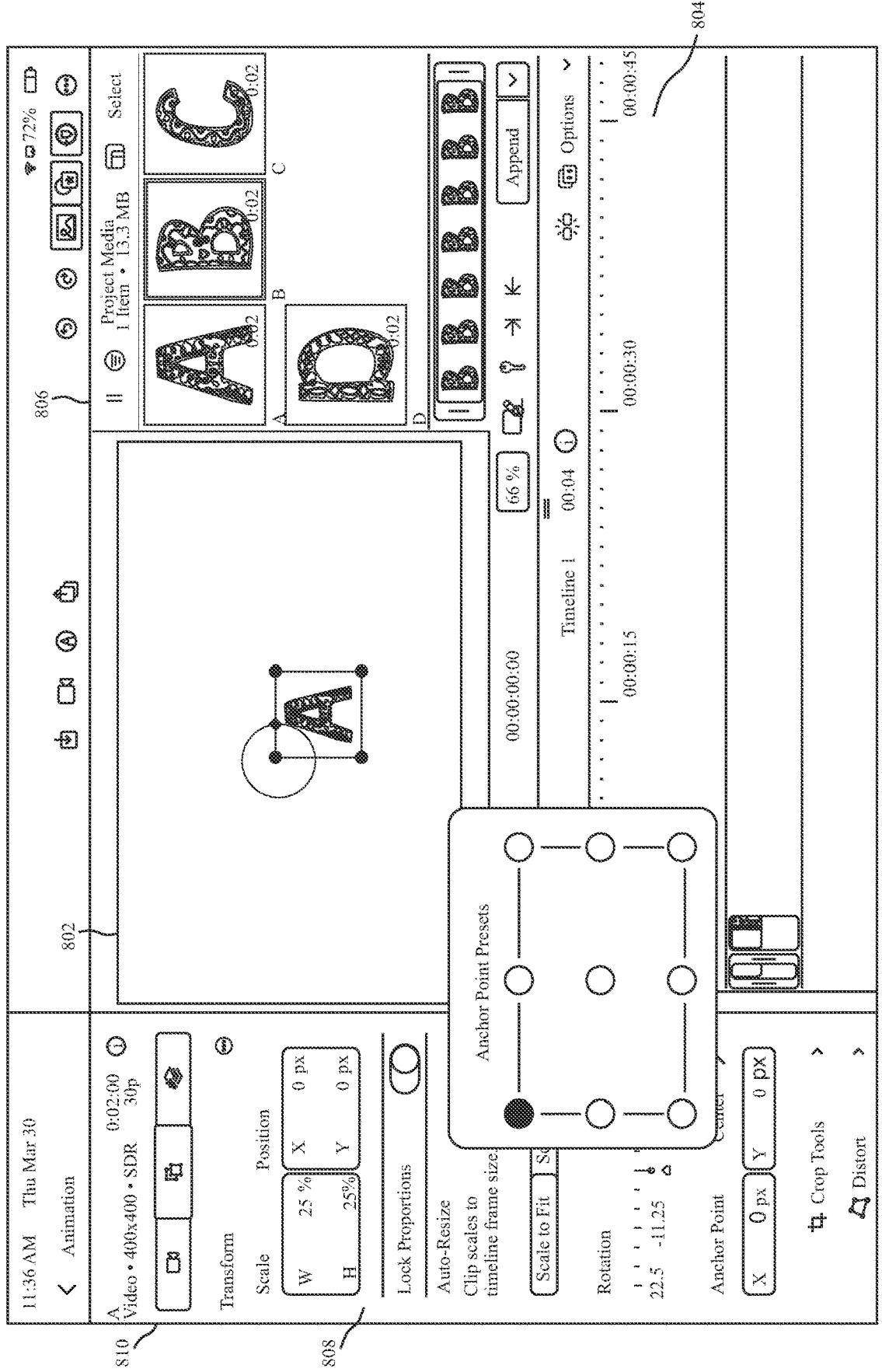

FIG. 8B shows user interface 810 where the user has selected the anchor point tool from the animation control 808. In response to this user selection, an anchor point control 812 is presented, where the user may select where anchor points are presented for the fancy letter "A" in the main display area 802.

Figure 8C:
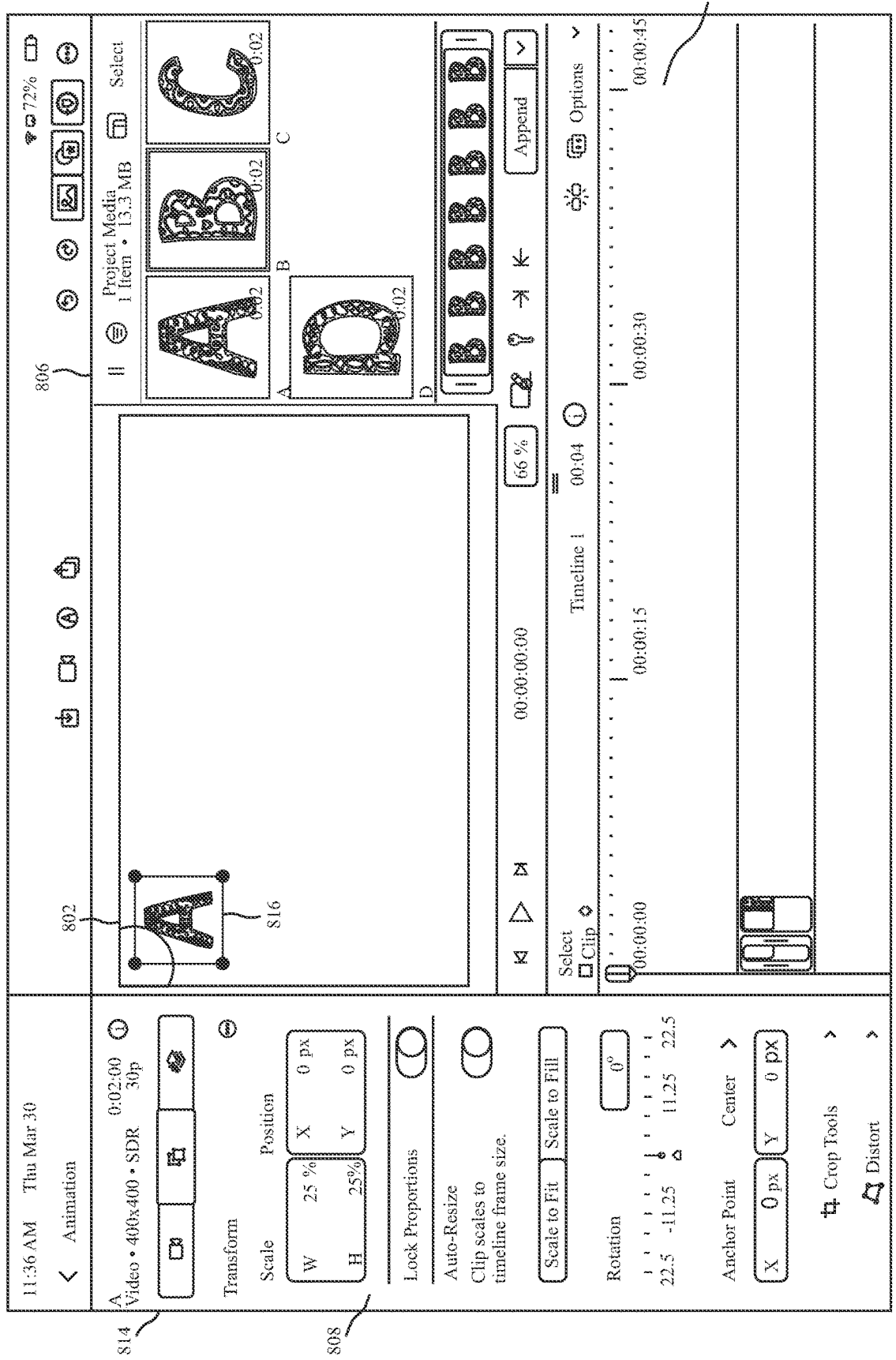

FIG. 8C shows user interface 814 where the user has placed the fancy letter "A" in a first position 816 at an upper left corner of the main display area 802 (e.g., by clicking the upper left anchor point and dragging the letter to the desired position). This action has been performed at time 00:00:00:00, as indicated by the playhead indicator along the timeline 804.

Figure 8D:
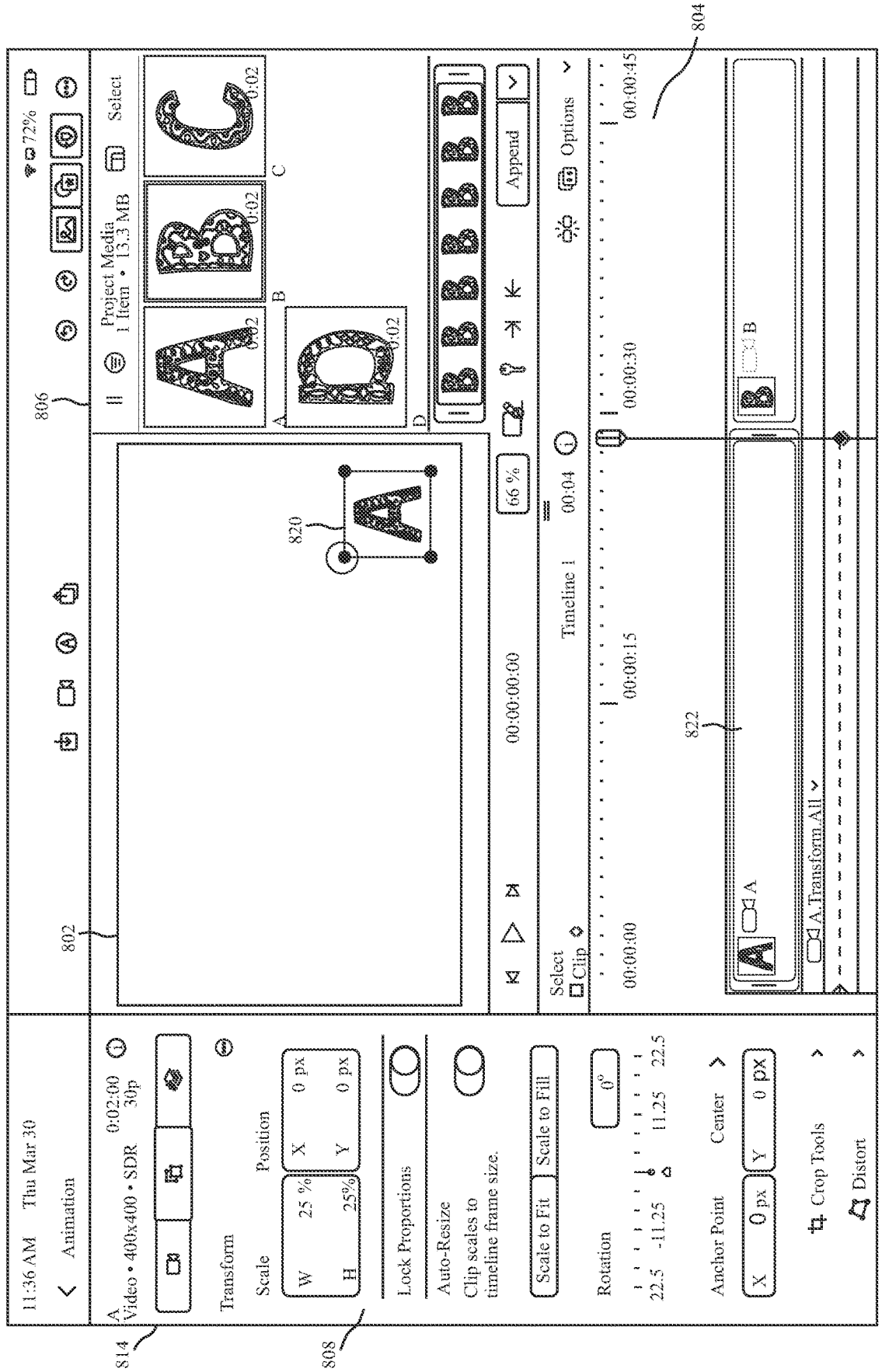

FIG. 8D shows user interface 818 where the user has placed the fancy letter "A" in a second position 820 at a lower right corner of the main display area 802 (e.g., by clicking the upper left anchor point and dragging the letter to the desired position). This action has been performed at approximately time 00:00:01:90, as indicated by the playhead indicator along the timeline 804. An animation 822 has been created based on the two positions of the letter "A" at two different points in time, such that the system generates an animation that shows the letter A move from the first position 816 to the second position 820 over the course of the time period indicated by the user. This animation 822 is shown on the timeline 804 having a length that corresponds to the time period.

Figure 8E:
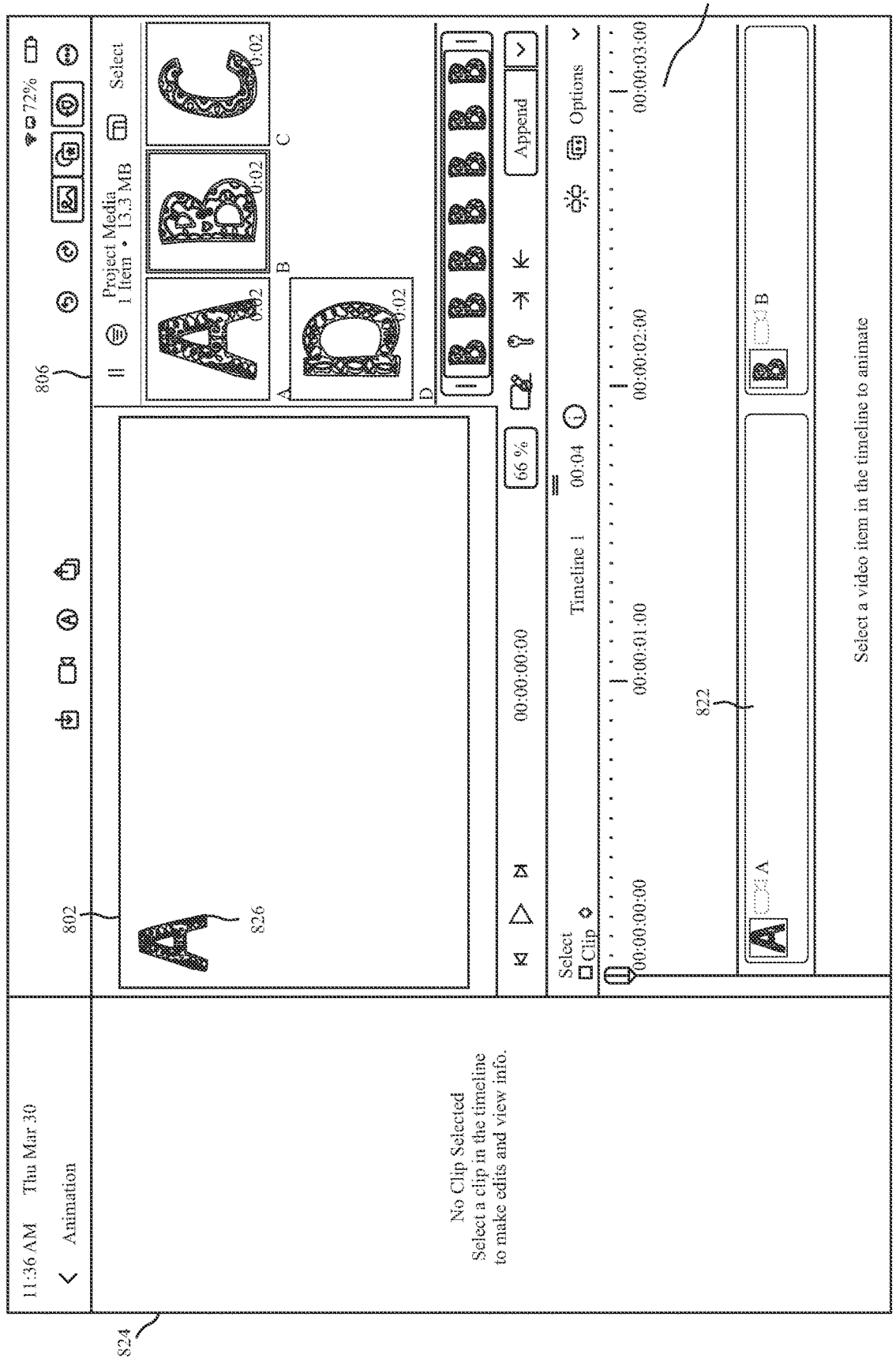
Figure 8F:
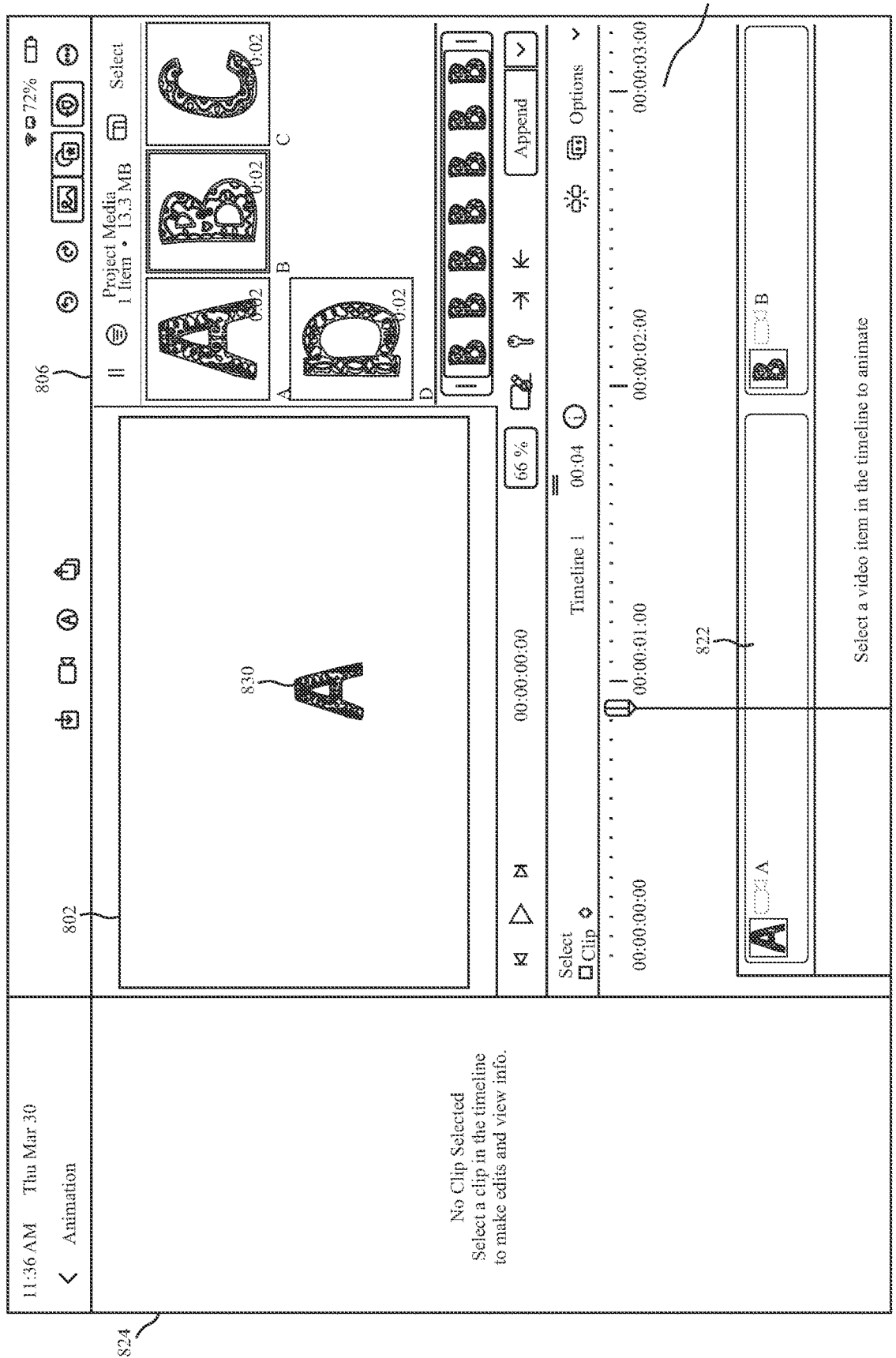
Figure 8G:
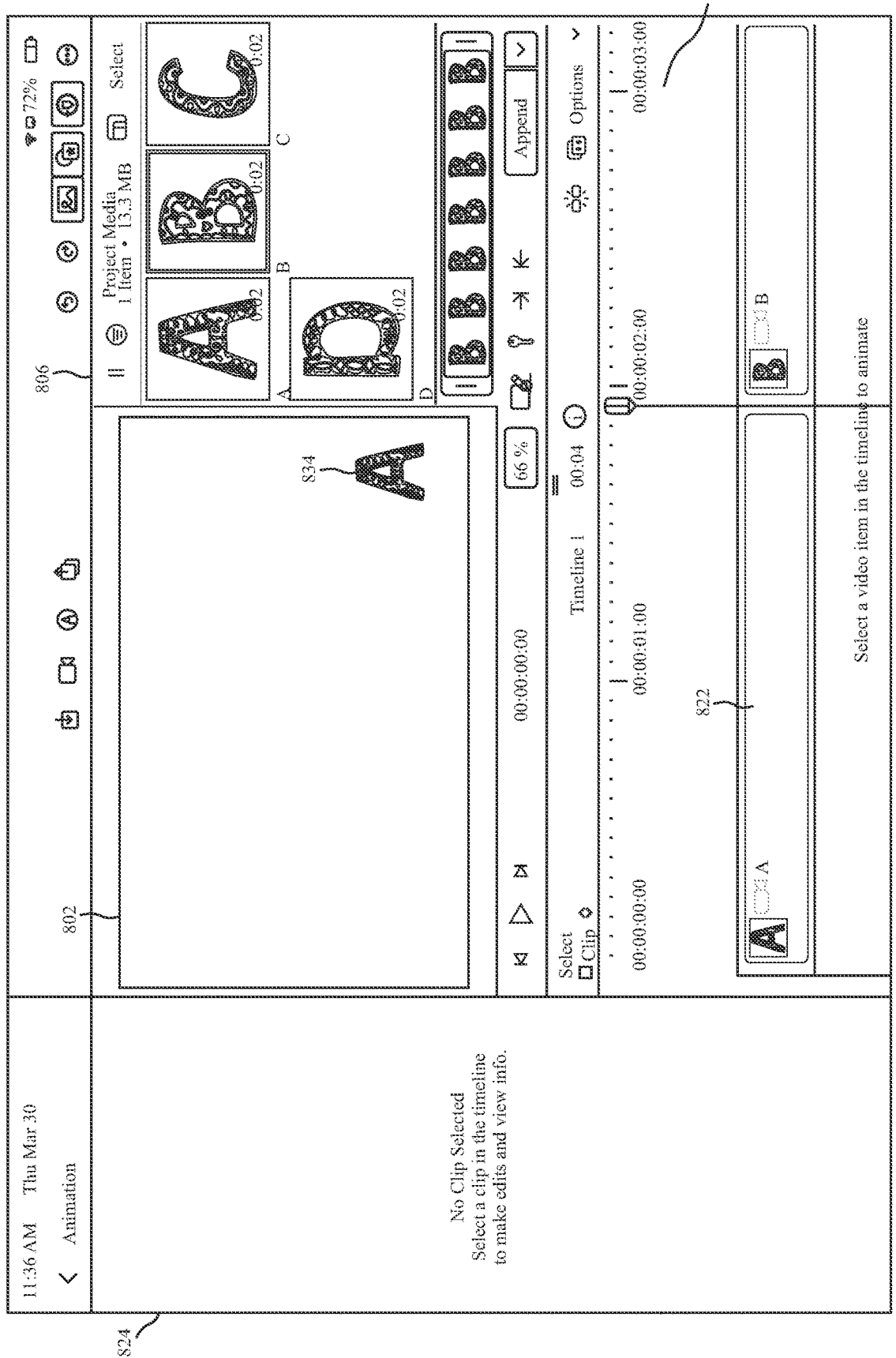

FIGS. 8E-8G show playback of the animation 822 after it has been created. FIG. 8E shows user interface 824 where the user has initiated playback of the media composition (e.g., the animation 822) starting at time 00:00:00:00. Playback 826 of the letter A begins at the first position.

FIG. 8F shows user interface 824 as playback of the media composition (e.g., the animation 822) continues, now approximately at time 00:00:00:90 as indicated by the playhead indicator along the timeline 804. Playback 830 of the letter A is now about half completed, based on the letter being positioned halfway between the first and second positions.

FIG. 8G shows user interface 824 where playback of the media composition (e.g., the animation 822) is complete. Playback 834 of the letter A has reached the second position, and the playhead indicator along the timeline 804 indicates a time of 00:00:01:90 which concludes the animation 822.

The animation 822 may be modified and/or manipulated along the timeline 804 via touch input, such as clipping the animation 822, moving the animation to another time position, expanding the animation 822, splitting the animation 822, etc.

Key-Framing Animations Using an Accessory on a Touch Device

In various embodiments an animation may be generated using touch input as described below.

1. A non-transitory computer readable medium comprising one or more sequences of instructions which, when executed by one or more processors, cause the one or more processors to perform operations comprising:
receiving a first user input selecting a first position for an image object to generate a first frame of an animation;
receiving a second user input selecting a second position for the image object to generate a second frame of the animation;
generating the animation at least by:
generating the first frame of the animation displaying the image object at the first position;
generating the second frame of the animation displaying the image object at the second position;
creating a plurality of frames that visualize a transition of the image object from the first position to the second position; and
assembling, in order, the first frame, the plurality of frames, and the second frame to form the animation.

2. The non-transitory computer readable medium as recited in claim 1, wherein the operations further comprise:
receiving a third user input selecting, for the transition, interpolated movement along one or more curves on a path from the first position to the second position,
wherein the plurality of frames visualize the interpolated movement along the one or more curves on the path from the first position to the second position.

3. The non-transitory computer readable medium as recited in claim 1, wherein the operations further comprise:
receiving a third user input selecting, for the transition, linear movement along one or more straight lines on a path from the first position to the second position,
wherein the plurality of frames visualize the linear movement along the one or more straight lines on the path from the first position to the second position.

4. The non-transitory computer readable medium as recited in claim 1, wherein the operations further comprise:
receiving a third user input selecting a third position for the image object; and
generating a third frame of the animation, the third frame being positioned between the first frame and the second frame,
wherein creating the plurality of frames that visualize the transition of the image object from the first position to the second position comprises:
creating a first subset of the plurality of frames that visualize a first portion of the transition of the image object showing the image object transitioning from the first position to the third position; and
creating a second subset of the plurality of frames that visualize a second portion of the transition of the image object showing the image object transitioning from the third position to the second position,
wherein the assembling comprises assembling, in order, the first frame, the first subset of the plurality of frames, the third frame, the second subset of the plurality of frames, and the second frame to form the animation.

5. The non-transitory computer readable medium as recited in claim 1, wherein the operations further comprise receiving a third user input selecting a duration for the animation, wherein a number of the plurality of frames corresponds to the duration for the animation.

6. The non-transitory computer readable medium as recited in claim 5, wherein the third user input selecting the duration for the animation comprises:
receiving the first user input in association with a first frame of a media composition; and
receiving the second user input in association with a second frame of the media composition,
wherein the duration corresponds to a period of time between playback of the first frame and the second frame during a playback of the media composition.

7. The non-transitory computer readable medium as recited in claim 6, wherein the operations further comprise:
adding the animation to the media composition; and
presenting a first playback of the media composition,
wherein during the first playback of the media composition:
initiating the animation when playback of the first frame is initiated during the first playback of the media composition; and
ceasing the animation subsequent to playback of the second frame during the first playback of the media composition.

8. The non-transitory computer readable medium as recited in claim 7, wherein the animation is overlaid on at least one video clip of the media composition.

9. The non-transitory computer readable medium as recited in claim 6, wherein the operations further comprise:
receiving a fourth user input modifying the duration of the animation;
adjusting the animation to have a second duration based on the fourth user input; and
subsequent to adjusting the animation to have the second duration, presenting a first playback of the media composition,
wherein during the first playback of the media composition, the animation is displayed for the second duration.

10. The non-transitory computer readable medium as recited in claim 1, wherein the operations further comprise:
receiving user input modifying one or more frames of the animation to generate a modified version of the animation; and
subsequent to modifying the one or more frames of the animation, presenting a first playback of a media composition comprising the modified version of the animation.

11. The non-transitory computer readable medium as recited in claim 10, wherein the user input comprises at least one of: clipping the animation to remove at least one portion of the animation, shrinking the animation to condense content of the animation during playback of the modified version of the animation, and/or expanding the animation to stretch the content of the animation during playback of the modified version of the animation.

12. The non-transitory computer readable medium as recited in claim 10, wherein the user input comprises at least one of: changing a color of the image object, changing a size of the image object, and/or changing a style of the transition of the image object from the first position to the second position.

13. The non-transitory computer readable medium as recited in claim 1, wherein the operations further comprise:
prior to or concurrent with receiving the first user input:
receiving a third user input selecting at least one of: a color, a style, a size, and a duration,
wherein, during playback of the animation, the image object is displayed in accordance with the third user input for at least a portion of the animation.

14. A system comprising:
one or more processors; and
a non-transitory computer readable medium comprising one or more sequences of instructions which, when executed by the one or more processors, cause the one or more processors to perform operations comprising:
receiving a first user input selecting a first position for an image object to generate a first frame of an animation;
receiving a second user input selecting a second position for the image object to generate a second frame of the animation;
generating the animation at least by:
generating the first frame of the animation displaying the image object at the first position;
generating the second frame of the animation displaying the image object at the second position;
creating a plurality of frames that visualize a transition of the image object from the first position to the second position; and
assembling, in order, the first frame, the plurality of frames, and the second frame to form the animation.

15. A method comprising:
receiving a first user input selecting a first position for an image object to generate a first frame of an animation;
receiving a second user input selecting a second position for the image object to generate a second frame of the animation;
generating the animation at least by:
generating the first frame of the animation displaying the image object at the first position;
generating the second frame of the animation displaying the image object at the second position;

creating a plurality of frames that visualize a transition of the image object from the first position to the second position; and assembling, in order, the first frame, the plurality of frames, and the second frame to form the animation.

Privacy

As described above, one aspect of the present technology is the gathering and use of data available from various sources to improve the machine learning model to provide video modification more relevant to the user. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to generate telestrations and/or animations based on user preferences gleaned from the personal information data. Accordingly, use of such personal information data enables users to control how the telestrations and/or animations are generated and/or incorporated into the media compositions. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of telestration and/or animation generation services, the present technology can be configured to allow users to select to "opt in" or "opt out" of participation in the collection of personal information data during registration for services or anytime thereafter. In another example, users can select not to provide mood-associated data for telestration and/or animation generation services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, telestrations and/or animations may be generated based on non-personal information data or a bare minimum amount of personal information, such as the content being requested by the device associated with a user, other non-personal information available to the video modification services, or publicly available information.

Example System Architecture

Figure 9:
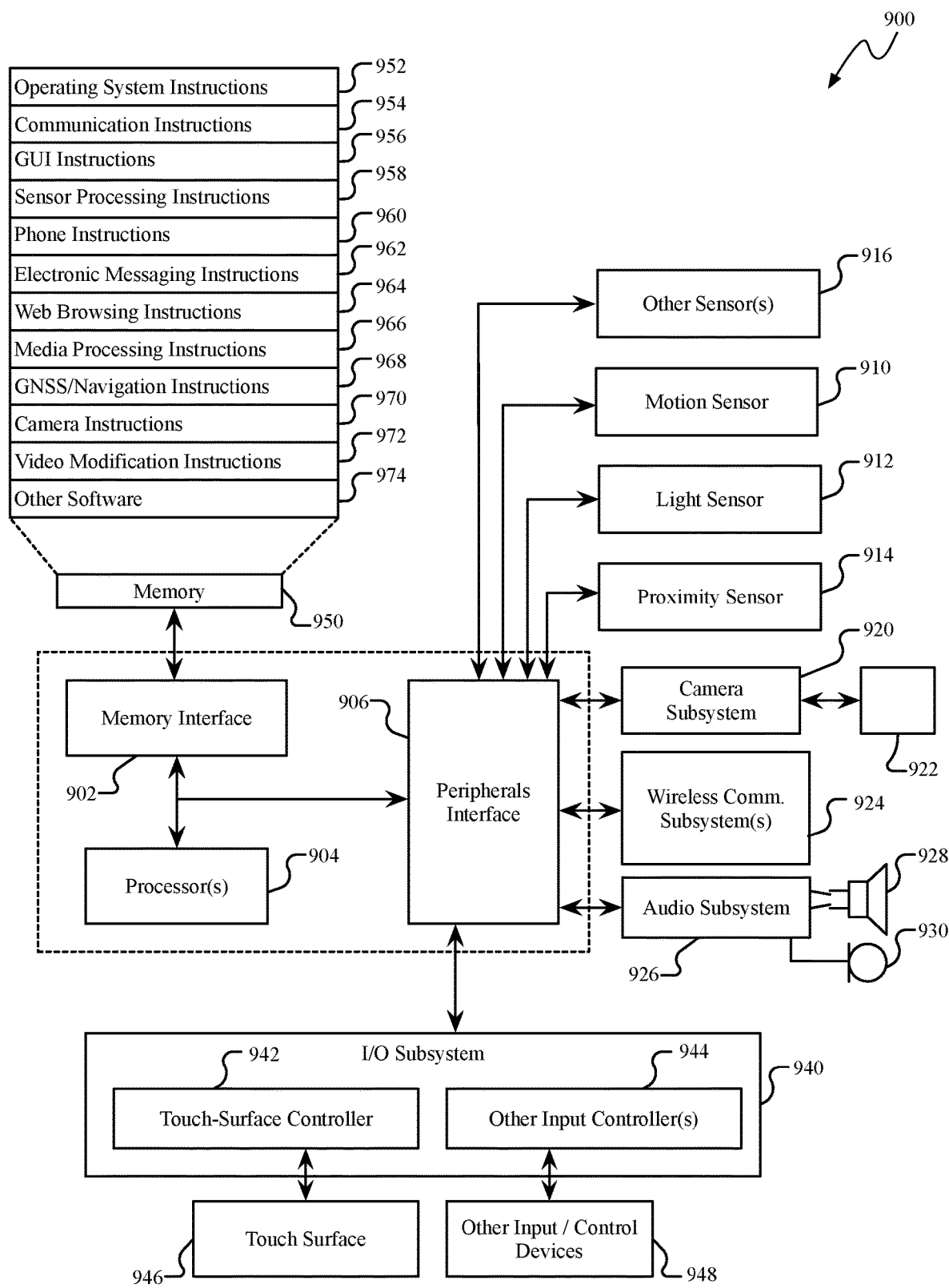
FIG. 9 is a block diagram of an example computing device that can implement the features and processes of FIGS. 1-8G.

FIG. 9 is a block diagram of an example computing device 900 that can implement the features and processes of FIGS. 1-8G. The computing device 900 can include a memory interface 902, one or more data processors, image processors and/or central processing units 904, and a peripherals interface 906. The memory interface 902, the one or more processors 904 and/or the peripherals interface 906 can be separate components or can be integrated in one or more integrated circuits. The various components in the computing device 900 can be coupled by one or more communication buses or signal lines.

Sensors, devices, and subsystems can be coupled to the peripherals interface 906 to facilitate multiple functionalities. For example, a motion sensor 910, a light sensor 912, and a proximity sensor 914 can be coupled to the peripherals interface 906 to facilitate orientation, lighting, and proximity functions. Other sensors 916 can also be connected to the peripherals interface 906, such as a global navigation satellite system (GNSS) (e.g., GPS receiver), a temperature sensor, a biometric sensor, magnetometer or other sensing device, to facilitate related functionalities.

A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips. The camera subsystem 920 and the optical sensor 922 can be used to collect images of a user to be used during authentication of a user, e.g., by performing facial recognition analysis.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which the computing device 900 is intended to operate. For example, the computing device 900 can include communication subsystems 924 designed to operate over a GSM network, a GPRS network, an EDGE network, a Wi-Fi or WiMax network, and a Bluetooth™ network. In particular, the wireless communication subsystems 924 can include hosting protocols such that the device 900 can be configured as a base station for other wireless devices.

An audio subsystem 926 can be coupled to a speaker 928 and a microphone 930 to facilitate voice-enabled functions, such as speaker recognition, voice replication, digital recording, and telephony functions. The audio subsystem 926 can be configured to facilitate processing voice commands, voiceprinting and voice authentication, for example.

The I/O subsystem 940 can include a touch-surface controller 942 and/or other input controller(s) 944. The touch-surface controller 942 can be coupled to a touch surface 946. The touch surface 946 and touch-surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 946.

The other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of the speaker 928 and/or the microphone 930.

In one implementation, a pressing of the button for a first duration can disengage a lock of the touch surface 946; and a pressing of the button for a second duration that is longer than the first duration can turn power to the computing device 900 on or off. Pressing the button for a third duration can activate a voice control, or voice command, module that enables the user to speak commands into the microphone 930 to cause the device to execute the spoken command. The user can customize a functionality of one or more of the buttons. The touch surface 946 can, for example, also be used to implement virtual or soft buttons and/or a keyboard.

In some implementations, the computing device 900 can present recorded audio and/or video files, such as MP3, AAC, and MPEG files. In some implementations, the computing device 900 can include the functionality of an MP3 player, such as an iPod™.

The memory interface 902 can be coupled to memory 950. The memory 950 can include high-speed random-access memory and/or non-volatile memory, such as one or more magnetic disk storage devices, one or more optical storage devices, and/or flash memory (e.g., NAND, NOR). The memory 950 can store an operating system 952, such as Darwin, RTXC, LINUX, UNIX, OS X, WINDOWS, or an embedded operating system such as VxWorks.

The operating system 952 can include instructions for handling basic system services and for performing hardware dependent tasks. In some implementations, the operating system 952 can be a kernel (e.g., UNIX kernel). In some implementations, the operating system 952 can include instructions for performing video modification. For example, operating system 952 can implement the video modification features as described with reference to FIGS. 1-8G.

The memory 950 can also store communication instructions 954 to facilitate communicating with one or more additional devices, one or more computers and/or one or more servers. The memory 950 can include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; telestration/animation generation instructions 966 to facilitate media processing-related processes and functions; GNSS/Navigation instructions 968 to facilitate GNSS and navigation-related processes and instructions; and/or camera instructions 970 to facilitate camera-related processes and functions.

The memory 950 can store software instructions 972 to facilitate other processes and functions, such as the animation and telestration processes and functions as described with reference to FIGS. 1-8G.

The memory 950 can also store other software instructions 974, such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions of the computing device 900 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A non-transitory computer readable medium comprising one or more sequences of instructions which, when executed by one or more processors, cause the one or more processors to perform operations comprising:
   presenting a first playback of a media composition on a touchscreen display of a computing device;
   concurrently with presenting the first playback of the media composition: receiving, via the touchscreen display of the computing device during a first time period, a touch input comprising a series of motions that start when a particular frame associated with the media composition is being presented;
   responsive to receiving the touch input during the first playback of the media composition: adding a media clip to the media composition, the media clip: (a) capturing a graphical representation of the touch input comprising the series of motions, (b) having a duration corresponding to the first time period, and (c) being stored in association with the particular frame of the media composition; and
   subsequent to adding the media clip to the media composition, presenting a second playback of the media composition,
   wherein during the second playback of the media composition, initiating playback of the media clip as an overlay when playback of the particular frame is initiated during the second playback of the media composition.

2. The non-transitory computer readable medium as recited in claim 1, wherein the media clip is played, during the second playback of the media composition, for the duration corresponding to the first time period.

3. The non-transitory computer readable medium as recited in claim 1, wherein the media clip is overlaid on at least one video clip of the media composition.

4. The non-transitory computer readable medium as recited in claim 1, wherein the operations further comprise:
   receiving user input modifying the duration of the media clip; and
   adjusting the media clip to have a second duration based on the user input.

5. The non-transitory computer readable medium as recited in claim 4, wherein the operations further comprise:
   subsequent to adjusting the media clip to have the second duration, presenting a third playback of the media composition,
   wherein during the third playback of the media composition, the media clip is played for the second duration.

6. The non-transitory computer readable medium as recited in claim 1, wherein the operations further comprise:
   receiving user input modifying frames of the media clip to generate a modified version of the media clip; and
   subsequent to modifying frames of the media clip, presenting a third playback of the media composition,
   wherein during the third playback of the media composition, the modified version of the media clip is played for the duration corresponding to the first time period in place of the media clip.

7. The non-transitory computer readable medium as recited in claim 6, wherein the user input comprises at least one of: clipping the media clip to remove at least one portion of the media clip, shrinking the media clip to condense content of the media clip during playback of the modified media clip, and/or expanding the media clip to stretch the content of the media clip during playback of the modified media clip.

8. The non-transitory computer readable medium as recited in claim 6, wherein the user input comprises at least one of: changing a color of the graphical representation of the touch input, changing a thickness of the graphical representation of the touch input, and/or changing a style of the graphical representation of the touch input.

9. The non-transitory computer readable medium as recited in claim 1, wherein the operations further comprise:
   concurrently with presenting the second playback of the media composition: receiving, via the touchscreen display of the computing device during a second time period, a second touch input comprising a second series of motions that start when a second frame associated with the media composition is being presented;
   responsive to receiving the second touch input: adding a second media clip to the media composition, the second media clip: (a) capturing a second graphical representation of the second touch input comprising the second series of motions, (b) having a second duration corresponding to the second time period, and (c) being stored in association with the second frame of the media composition;
   subsequent to adding the second media clip to the media composition, presenting a third playback of the media composition,
   wherein during the third playback of the media composition, initiating playback of the second media clip as an overlay when playback of the second frame is initiated during the third playback of the media composition.

10. The non-transitory computer readable medium as recited in claim 1, wherein the media clip consists of a single video track, the single video track comprising the graphical representation of the touch input.

11. The non-transitory computer readable medium as recited in claim 1, wherein the operations further comprise:
    prior to or concurrent with receiving the touch input comprising the series of motions: receiving a user input selecting at least one of: a color, a style, a size of tip, and a duration,
    wherein the graphical representation of the media clip is displayed in accordance with the user input during the second playback of the media composition.

12. A system comprising:
    one or more processors; and
    a non-transitory computer readable medium comprising one or more sequences of instructions which, when executed by the one or more processors, cause the one or more processors to perform operations comprising:
    presenting a first playback of a media composition on a touchscreen display of a computing device;
    concurrently with presenting the first playback of the media composition: receiving, via the touchscreen display of the computing device during a first time period, a touch input comprising a series of motions that start when a particular frame associated with the media composition is being presented;
    responsive to receiving the touch input during the first playback of the media composition: adding a media clip to the media composition, the media clip: (a) capturing a graphical representation of the touch input comprising the series of motions, (b) having a duration corresponding to the first time period, and (c) being stored in association with the particular frame of the media composition; and subsequent to adding the media clip to the media composition, presenting a second playback of the media composition, wherein during the second playback of the media composition, initiating playback of the media clip as an overlay when playback of the particular frame is initiated during the second playback of the media composition.

13. The system as recited in claim 12, wherein the media clip is played, during the second playback of the media composition, for the duration corresponding to the first time period.

14. The system as recited in claim 12, wherein the media clip is overlaid on at least one video clip of the media composition.

15. The system as recited in claim 12, wherein the operations further comprise:

receiving user input modifying the duration of the media clip; and adjusting the media clip to have a second duration based on the user input.

16. The system as recited in claim 15, wherein the operations further comprise:

subsequent to adjusting the media clip to have the second duration, presenting a third playback of the media composition, wherein during the third playback of the media composition, the media clip is played for the second duration.

17. The system as recited in claim 12, wherein the operations further comprise:

receiving user input modifying frames of the media clip to generate a modified version of the media clip; and subsequent to modifying frames of the media clip, presenting a third playback of the media composition, wherein during the third playback of the media composition, the modified version of the media clip is played for the duration corresponding to the first time period in place of the media clip.

18. The system as recited in claim 12, wherein the operations further comprise:

concurrently with presenting the second playback of the media composition: receiving, via the touchscreen display of the computing device during a second time period, a second touch input comprising a second series of motions that start when a second frame associated with the media composition is being presented;

responsive to receiving the second touch input: adding a second media clip to the media composition, the second media clip: (a) capturing a second graphical representation of the second touch input comprising the second series of motions, (b) having a second duration corresponding to the second time period, and (c) being stored in association with the second frame of the media composition;

subsequent to adding the second media clip to the media composition, presenting a third playback of the media composition, wherein during the third playback of the media composition, initiating playback of the second media clip as an overlay when playback of the second frame is initiated during the third playback of the media composition.

19. The system as recited in claim 12, wherein the operations further comprise:

prior to or concurrent with receiving the touch input comprising the series of motions: receiving a user input selecting at least one of: a color, a style, a size of tip, and a duration, wherein the graphical representation of the media clip is displayed in accordance with the user input during the second playback of the media composition.

20. A method comprising:

presenting a first playback of a media composition on a touchscreen display of a computing device;

concurrently with presenting the first playback of the media composition: receiving, via the touchscreen display of the computing device during a first time period, a touch input comprising a series of motions that start when a particular frame associated with the media composition is being presented;

responsive to receiving the touch input during the first playback of the media composition: adding a media clip to the media composition, the media clip: (a) capturing a graphical representation of the touch input comprising the series of motions, (b) having a duration corresponding to the first time period, and (c) being stored in association with the particular frame of the media composition; and subsequent to adding the media clip to the media composition, presenting a second playback of the media composition, wherein during the second playback of the media composition, initiating playback of the media clip as an overlay when playback of the particular frame is initiated during the second playback of the media composition.

* * * * *